(12) United States Patent
Kamei

(10) Patent No.: US 8,606,019 B2
(45) Date of Patent: Dec. 10, 2013

(54) MATCHING METHOD FOR TWO-DIMENSIONAL PATTERN, FEATURE EXTRACTING METHOD, APPARATUS USED FOR THE METHODS, AND PROGRAMS

(75) Inventor: Toshio Kamei, Tokyo (JP)

(73) Assignee: NEC Corporation, Tokyo (JP)

( * ) Notice: Subject to any disclaimer, the term of this patent is extended or adjusted under 35 U.S.C. 154(b) by 1055 days.

(21) Appl. No.: 12/597,119

(22) PCT Filed: Apr. 21, 2008

(86) PCT No.: PCT/JP2008/057689
§ 371 (c)(1),
(2), (4) Date: Nov. 17, 2009

(87) PCT Pub. No.: WO2008/133235
PCT Pub. Date: Nov. 6, 2008

(65) Prior Publication Data
US 2010/0150452 A1 Jun. 17, 2010

(30) Foreign Application Priority Data
Apr. 23, 2007 (JP) ................................ 2007-113264

(51) Int. Cl.
*G06K 9/46* (2006.01)
(52) U.S. Cl.
USPC ......................................... 382/218; 382/190
(58) Field of Classification Search
USPC ......... 382/100, 159, 154, 118, 218, 190, 225,
382/228, 156, 304, 203, 217, 224, 76, 302,
382/181, 155, 209, 195, 197, 198, 168;
706/16, 22, 25, 15; 348/625;
257/E21.537, E29.312, E21.544,
257/E21.614, E27.026, E21.54, 278
See application file for complete search history.

(56) References Cited

U.S. PATENT DOCUMENTS

| | | | |
|---|---|---|---|
| 5,040,224 A | 8/1991 | Hara | |
| 5,426,708 A | 6/1995 | Hamada et al. | |

(Continued)

FOREIGN PATENT DOCUMENTS

| | | | |
|---|---|---|---|
| JP | 7-21373 A | 1/1995 | |
| JP | 2690103 B2 | 8/1997 | |

(Continued)

OTHER PUBLICATIONS

Noriyuki Matsumoto et al., "The Fingerprint Verification Methods Based on the FFT and LPC Analysis," The Institute of Electronics, Information and Communication Engineers Technical Report, Pattern Recognition and Understanding, PRU92-4, 1992, pp. 25-31.

(Continued)

*Primary Examiner* — Sheela Chawan
(74) *Attorney, Agent, or Firm* — Foley & Lardner LLP

(57) ABSTRACT

A 2-dimensional pattern matching method contains a process of extracting a query feature data by projecting a vector representation of either of a query 2-dimensional pattern and a transformed query 2-dimensional pattern which is generated by transforming the query 2-dimensional pattern, to a feature space. An enrollment feature data as previously enrolled and a query feature data are inversely projected to the 2-dimensional pattern representation space which has the dimension of the vector representation and the similarity is calculated. The data size of a feature amount is small and a matching technique robust to the positional displacement and the image distortion is provided.

25 Claims, 16 Drawing Sheets

(56) References Cited

U.S. PATENT DOCUMENTS

| | | | |
|---|---|---|---|
| 5,774,576 A * | 6/1998 | Cox et al. | 382/160 |
| 5,832,102 A | 11/1998 | Uchida | |
| 6,067,369 A | 5/2000 | Kamei | |
| 6,243,492 B1 | 6/2001 | Kamei | |
| 6,836,554 B1 * | 12/2004 | Bolle et al. | 382/116 |
| 2005/0105779 A1 | 5/2005 | Kamei | |
| 2005/0201595 A1 | 9/2005 | Kamei | |

FOREIGN PATENT DOCUMENTS

| | | |
|---|---|---|
| JP | 2776340 B2 | 5/1998 |
| JP | 2815045 B2 | 8/1998 |
| JP | 3057590 B2 | 4/2000 |
| JP | 2003-67751 A | 3/2003 |
| JP | 3873793 B2 | 10/2003 |
| JP | 2004-192603 A | 7/2004 |

OTHER PUBLICATIONS

Hironobu Fujiyoshi et al., "Fingerprint Verification Method Using the Transition Probability of Spectrum," The Transactions of the Institute of Electronics, Information and Communication Engineers D-II, May 1997, pp. 1169-1177, vol. J80-D-II, No. 5.

Baback Moghaddam et al., "Probabilistic Visual Learning for Object Detection," Proceedings of the IEEE $5^{th}$ International Conference on Computer Vision, 1995, pp. 786-793.

Wenyi Zhao et al., "Discriminant Analysis of Principal Components for Face Recognition," Proceedings of the IEEE $3^{rd}$ International Conference on Automatic Face and Gesture Recognition, 1998, pp. 336-341.

ISO/IEC, "Information Technology—Multimedia Content Description Interface—Part 3: Visual, Amendment 1: Visual Extensions," International Standard ISO/IEC 15938-3, 2002, pp. 15-29.

ISO/IEC, "Information Technology—Multimedia Content Description Interface—Part 8: Extraction and Use of MPEG-7 Descriptions, Amendment 1: Extensions of Extraction and Use of MPEG-7 Descriptions," Technical Report ISO/IEC TR 15938-8, 2002, pp. 23-27.

Vadim Mottl et al., "Elastic Transformation of the Image Pixel Grid for Similarity Based Face Identification," Proceedings of $18^{th}$ International Conference on Pattern Recognition, 2002, pp. 549-552, vol. 3.

Katsuhiko Sakaue, "Stereo Matching by the Combination of Genetic Algorithm and Active Net," Transaction of the Institute of Electronics, Information and Communication Engineers D-II, 1994, p. 2239-2246, vol. J77-D-II, No. 11.

* cited by examiner

MATCHING METHOD FOR TWO-DIMENSIONAL PATTERN, FEATURE EXTRACTING METHOD, APPARATUS USED FOR THE METHODS, AND PROGRAMS

TECHNICAL FIELD

The present invention relates to a matching method for two-dimensional pattern, a feature extracting method, and apparatuses used for the methods and programs, and particularly, relates to a matching method for two-dimensional pattern such as a fingerprint image, a face image, and a vein image used for biometric authentication, a feature extracting method, and apparatuses used for the methods and programs. This patent application claims a priority on convention based on Japanese Patent Application No. 2007-113264 filed on Apr. 23, 2007. The disclosure thereof is incorporated herein by reference.

BACKGROUND ART

As shown in literatures 1 to 3, 9 and 10 listed in the last of this section, methods for extracting a frequency feature from a fingerprint image data, calculating a similarity between feature amounts by using the feature amounts, and identifying the fingerprint in order to perform fingerprint matching are known as the matching technique for this type of two-dimensional pattern.

A spectrum obtained from a transfer function estimated by a Fourier spectrum or a linear prediction method (LPC spectrum; Linear Prediction Coefficient Spectrum), an LPC cepstrum corresponding to coefficients obtained by performing the inverse Fourier transformation to the LPC spectrum, a Group Delay Spectrum (GDS), and the like are used as a frequency analysis to obtain the frequency feature. In addition, a method using a Euclidean distance, a matching based on a dynamic programming (DP matching: Dynamic Programming Matching), a Hidden Markov Model (HMM), and the like are used as the method for calculating a similarity between feature amounts.

Meanwhile, in literatures 11 and 12, a method is described for carrying out a face identification by performing a principal component analysis and a discriminant analysis to pixel values of a face image to compress data greatly, and then performing a two-dimensional pattern matching in order to check a face.

In literatures 4, 5, 13 and 14 is disclosed a technique for extracting a Fourier spectrum from a local region of a face image, extracting a feature amount by performing a principal component analysis, discriminant analysis, and the like to perform a substantial dimensional compression, and then performing a face matching. A similarity of the obtained feature amount is measured by using the Euclidean distance for weighting.

Literature 15 and 16 disclose a matching method based on a DP matching and a matching method based on the active net, respectively.

Literature 6 discloses a technique for detecting a distal line of a finger, and literature 7 discloses a technique for detecting a center of a fingerprint. In addition, literature 8 discloses one example of a device for imaging a vascular pattern.

The literatures are listed below.
Literature 1: Japanese Patent No. 2815045 (FIGS. 16 and 17, [0235] to [0263])
Literature 2: Japanese Patent No. 3057590
Literature 3; Japanese Patent Application Publication JP-2003-67751A
Literature 4: Japanese Patent No. 3873793
Literature 5: Japanese Patent Application Publication JP-2004-192603A
Literature 6: Japanese Patent No. 2776340
Literature 7: Japanese Patent No. 2690103
Literature 8: Japanese Patent Application Publication (JP-A-Heisei 07-21373, FIG. 3, [0015] to [0020])
Literature 9: "The Fingerprint Verification Methods Based on the FFT and LPC Analysis" (The Institute of Electronics, Information and Communication Engineers Technical Report, Pattern Recognition and Understanding, PRU92-4, 1992) by Noriyuki MATSUMOTO et al.
Literature 10: "Fingerprint Verification Method Using the Transition Probability of Spectrum" (The transactions of the Institute of Electronics, Information and Communication Engineers D-II, Vol. J80-D-II, No. 5, pp. 1169-1177, May 1997) by Hironobu FUJIYOSHI et al.
Literature 11: "Probabilistic Visual Learning for Object Detection" (Proceeding of the 5th International Conference on Computer Vision, 1995, pp. 786-793) by B. Moghaddam et al.
Literature 12: "Discriminant Analysis of Principal Components for Face Recognition" (Proceedings of the IEEE 3rd International Conference on Automatic Face and Gesture Recognition, 1998, pp. 336-341) by W. Zhao et al.
Literature 13: "ISO/IEC, Information technology-Multimedia content description interface-Part 3: Visual Amendment1: Visual extensions (ISO/IEC 15938-3: 2002/Amd.1: 2004, pp. 15-29)
Literature 14: "ISO/IEC, Information technology-Multimedia content description interface-Part 8: Extraction and use of MPEG-7 descriptions Amendment1: Extensions of extraction and use of MPEG-7 descriptions" (ISO/IEC TR 15938-8: 2002/Amd.1: 2004, pp. 23-27)
Literature 15: "Elastic Transformation of the Image Pixel Grid for Similarity Based Face Identification" (Proceedings of the 16th International Conference on Pattern Recognition, Volume 3, 2002, pp. 549-552) by V. Mottl et al.
Literature 16: "Stereo Matching by the Combination of Genetic Algorithm and Active Net" (Transaction of The Institute of Electronics, Information and Communication Engineers D-II, Vol. J77-D-II, No. 11, 1994, pp. 2239-2246) by SAKAUE

DISCLOSURE OF THE INVENTION

Problems of the above-mentioned techniques are in that a data size of a feature amount is small, the matching that absorbs a positional displacement and distortion cannot be simultaneously carried out, and thus high matching accuracy cannot be obtained. This is because a request to reduce the data size and a request to absorb the positional displacement and deformation cannot be simultaneously satisfied. For example, when the DP matching or the HMM is employed by using frequency features such as the Fourier frequency and the LPC cepstrum, the positional displacement and deformation can be absorbed in the matching and accordingly the matching with high accuracy can be carried out, but the data amount of the frequency feature becomes large.

Meanwhile, though the data size becomes small in a technique for carrying out the matching after compacting data by performing the principal component analysis and the discriminant analysis to pixel values or the frequency feature of an image, the technique is not robust to the positional change. Accordingly, when preliminary positional alignment is not sufficient or when the deformation, for example, the distortion exists in the object to be matched, it is difficult to absorb the positional displacement and to obtain high identification accuracy.

Therefore, an object of the present invention is to provide a highly-accurate matching technique for a two-dimensional pattern can reduce a data size of a feature amount and simultaneously perform the matching that absorbs the positional displacement and distortion.

A 2-dimensional pattern matching method in an exemplary embodiment of the present invention includes:

(a) previously enrolling an enrollment feature data that is vector data in a feature space;

(b) inputting a query 2-dimensional pattern;

(c) generating query feature data by projecting a vector representations of, one of the query 2-dimensional pattern and a transformed query 2-dimensional pattern generated by transforming the query 2-dimensional pattern, to the feature space;

(d) generating an enrollment 2-dimensional pattern and a reconstructed query 2-dimensional pattern by inversely projecting the enrollment feature data and the query feature data to a 2-dimensional pattern representation space having dimensions of the vector representation; and (e) calculating a similarity between the enrollment 2-dimensional pattern and the reconstructed query 2-dimensional pattern.

A 2-dimensional pattern feature extracting method for extracting the feature data of the 2-dimensional pattern used for the 2-dimensional pattern matching method, wherein the (c) extracting comprises:

(c1) generating the transformed query 2-dimensional pattern by extracting a 1-dimensional frequency feature for each horizontal line or vertical line of the query 2-dimensional pattern and generating the vector representation of the transformed query 2-dimensional pattern; and (c2) extracting the query feature data as the feature data of the query 2-dimensional pattern by carrying out a dimensional compression to the vector representation according to a first linear transformation defined by a basis matrix.

A 2-dimensional pattern feature extracting method used for the 2-dimensional pattern matching method, wherein the (c) extracting comprises;

(c1) generating the transformed query 2-dimensional pattern by extracting a 1-dimensional frequency feature for each horizontal line or vertical line of the query 2-dimensional pattern;

(c2) generating a vector representation by combining the 1-dimensional frequency features extracted for each line by a first linear transformation which is defined by a first basis matrix; and (c3) extracting query feature data as the 2-dimensional pattern feature data by carrying out a dimensional compression to the vector representation according to a second linear transformation defined by a second basis matrix.

A 2-dimensional pattern matching apparatus according to an exemplary embodiment of the present invention is for matching a query 2-dimensional pattern by using an enrollment feature data that is preliminarily-enrolled vector data in a feature space, includes: a linear transformation section for extracting query feature data by projecting any one of vector representations of; the inputted query 2-dimensional pattern; and transformed query 2-dimensional pattern generated by transforming the query 2-dimensional pattern to the feature space; a reconstructing section for generating the enrollment 2-dimensional pattern and a reconstructed query 2-dimensional pattern by inversely projecting the enrollment feature data and the query feature data to a 2-dimensional pattern representation space having a dimension of a vector representation; and a determining section for calculating a similarity between the enrollment 2-dimensional pattern and the reconstructed query 2-dimensional pattern.

A 2-dimensional pattern feature extracting apparatus to extract the feature data of the 2-dimensional pattern used for the 2-dimensional pattern matching apparatus, wherein the linear transformation section generates the transformed query 2-dimensional pattern by extracting a 1-dimensional frequency feature in each horizontal line or vertical line of the query 2-dimensional pattern and generates a vector representation of the transformed query 2-dimensional pattern, and extracts the query feature data as the feature data of the query 2-dimensional pattern by carrying out a dimensional compression to the vector representation according to a first linear transformation defined by a basis matrix.

A 2-dimensional pattern feature extracting apparatus for extracting a feature data of a 2-dimensional pattern used in the 2-dimensional pattern matching apparatus, wherein the linear transformation section includes: extracts a 1-dimensional frequency feature in each horizontal line or vertical line of the query 2-dimensional pattern, generates the transformed query 2-dimensional pattern by combining the 1-dimensional frequency features in each line where the 1-dimensional frequency features were extracted by a first linear transformation defined by a first basis matrix, generates a vector representation of the transformed query 2-dimensional pattern; and extracts query feature data as the feature data of the 2-dimensional pattern by carrying out a dimensional compression to the vector representation according to a second linear transformation defined by a second basis matrix.

A matching process program, a feature extraction program in one example of the exemplary embodiment of the present invention make a computer execute the above-mentioned matching method and the feature extracting method.

According to the present invention, it can be realized to simultaneously satisfy a request to reduce a data size and a request to absorb the positional displacement and deformation, namely, to carry out robust matching after suppressing a data size of the feature amount. That is because a pattern reconstructed by inversely projecting data to which a dimensional compression such as a principal component analysis and a discriminant analysis is carried out has a spatial data arrangement, and a matching method accepting a positional displacement and distortion, for example, the DP matching and the normalized correlation can be applied. Accordingly, the highly-accurate 2-dimensional pattern matching that is robust to the positional displacement and distortion can be carried out.

BEST MODE FOR CARRYING OUT THE INVENTION

Hereinafter, exemplary embodiments of the present invention will be described in detail with reference to the attached drawings.

1.1: First Exemplary Embodiment

Figure 1:
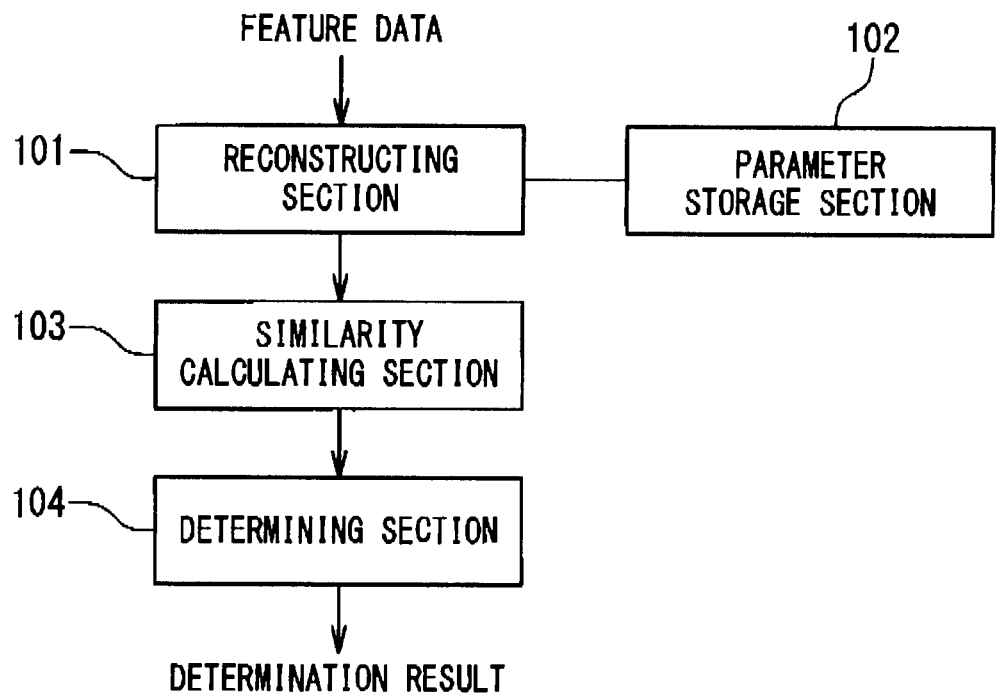
FIG. 1 is a block diagram showing a configuration of a matching apparatus according to a first exemplary embodiment of the present invention.

FIG. 1 is a block diagram showing a configuration of a matching apparatus according to a first exemplary embodiment of the present invention. Referring to FIG. 1, the matching apparatus according to the present exemplary embodiment includes a reconstructing section (inverse transformation section) 101 for reconstructing a two-dimensional pattern from feature data obtained by a principal component analysis, a discriminant analysis, and the like, a parameter storage section 102 for storing a basis matrix required for the reconstruction, a similarity calculating section 103 for calculating a similarity of the two-dimensional pattern obtained by the reconstructing section 101 according to a DP matching and the like, and a determining section 104 for carrying out a similarity determination by using the similarity obtained from the similarity calculating section 103.

Figure 2:
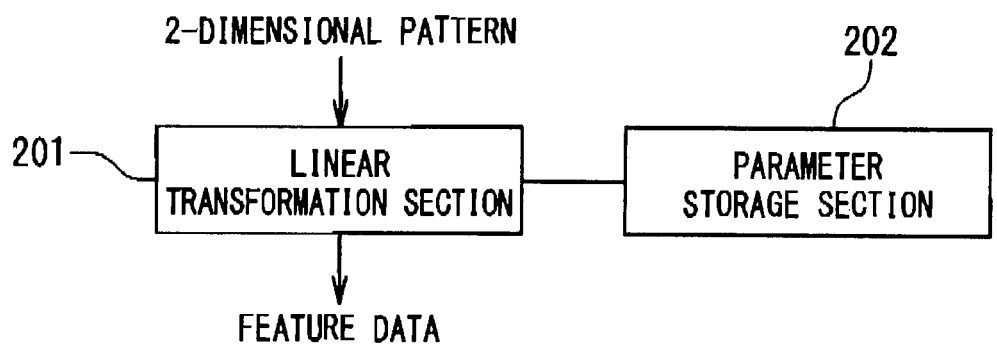
FIG. 2 is a block diagram showing a basic configuration of a feature extracting apparatus for extracting feature data to be inputted to the matching apparatus of FIG. 1.

FIG. 2 is a block diagram showing a basic configuration of a feature extracting apparatus for extracting the above-mentioned feature data. The feature extracting apparatus includes a linear transformation section 201 for extracting the feature data from the two-dimensional pattern according to the principal component analysis, the discriminant analysis, and the like, and a parameter storage section 202 for storing a basis matrix required for the linear transformation.

Figure 18:
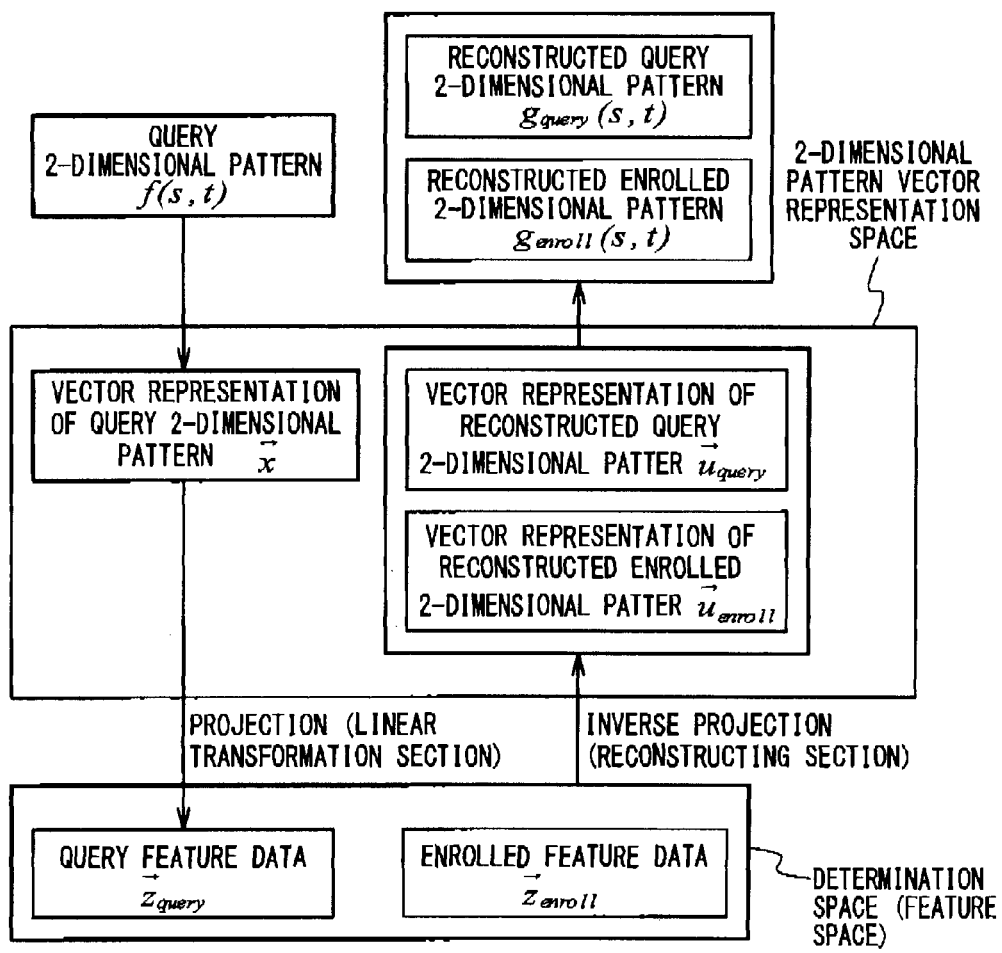
FIG. 18 shows a relationship between data.

In the present exemplary embodiment, the two-dimensional pattern matching will be described by using a face image as an example. FIG. 18 shows a relationship of data generated in processes of the matching. First of all, a process of extracting the feature data in the feature extracting apparatus shown in FIG. 2 will be described.

The following description will be made by assuming that the feature data is extracted by using a technique, described in the literature 12, of performing a discriminant analysis to a principal component of the face image. At first, a query two-dimensional pattern that is a two-dimensional pattern to be matched or an enrolled two-dimensional pattern previously enrolled for the matching is inputted. By normalizing the two-dimensional pattern according to a method of matching eye positions to predetermined positions, a two-dimensional pattern (s,t) that is a normalized face image is generated.

The linear transformation section 201 extracts the feature data z as a feature amount from the two-dimensional pattern by projecting a vector representation of the two-dimensional pattern f(s,t) on a discriminant space (a feature space).

Specifically, the linear transformation section 201 linearly transforms an L-dimensional vector x (hereinafter a vector symbol "→" is omitted in the description) having the respective pixel values of the two-dimensional pattern f(s,t) as elements on a two-dimensional pattern vector presentation space by using a basis matrix W and obtains an N-dimensional output vector (feature data) z (the following equation (1)).

$$\vec{z} = W^T \vec{x} \tag{1}$$

An order of the respective elements $x_i$ of the L-dimensional vector x may be an order in which the pixels are sampled upon the raster scan in a horizontal direction from an upper right to a lower left of an image.

In accordance with the literature 12, 42 pixels×48 pixels in a size of a face image normalized on the basis of the eye positions, i.e., 2016 pixels in total serves as elements of an input vector. In this case (L=2016), the basis matrix W is shown by the following equations (2) by using a principal component matrix $W_{PCA}$ (matrix of L rows×M columns) to obtain M principal components of the face image and a discriminant matrix $W_{LDA}$ (matrix of M rows×N columns) to obtain a projection of the M principal components to the discriminant space.

$$\vec{y} = W_{PCA}^T \vec{x}$$

$$\vec{z} = W_{LDA}^T \vec{y}$$

$$= W_{LDA}^T W_{PCA}^T \vec{x}$$

$$W^T = W_{LDA}^T W_{PCA}^T$$

$$W = W_{PCA} W_{LDA} \tag{2}$$

The respective elements of the vector y in the above-mentioned equation (2) represent the respective principal components of the vector x. When the number of two hundred- to three hundred-dimension (M=200 to 300) is used as the number of dimensions of the principal components and a few ten-dimension, for example, fifty-dimension (N=50) is used as the number of dimensions of the feature data (vector) z, the basis matrix W becomes a matrix of L rows and N columns (matrix of 2016×50). This basis matrix W is stored in the parameter storage section 202. Specifically, when the vector x of the face image is given, the linear transformation section 201 calculates the feature data z in accordance with the equation (1) by using the basis matrix W stored in the parameter storage section 202.

Meanwhile, in the reconstructing section 101 of FIG. 1, a two-dimensional pattern vector u is reconstructed from the given feature vector z by using the basis matrix W stored in the parameter storage section 102. The two-dimensional pattern u in a vector form is a vector in a same coordinate system as that of the vector x consisting of the pixel values of an inputted image as elements, and a value $u_i$ of each element means a value of a pixel at a same position in the two-dimensional space as in the pixel $x_i$ corresponding to the vector x.

When basis vectors of the basis matrix W are $e_1, e_2, \ldots e_N$, the image reconstruction can be performed by the following equations (3).

$$\vec{W} = (\vec{e_1} \vec{e_2} \ldots \vec{e_N})$$

$$\vec{u} = z_1 \vec{e_1} + z_2 \vec{e_2} + \ldots + z_N \vec{e_N}$$

$$= W\vec{z} \quad (3)$$

Here, the basis vector $e_i$ is an L-dimensional vector, and $Z_i$ is each element of the feature data z.

Generally, in a biometric authentication system, the feature data is enrolled on a server, an IC card, and the like in the enrollment, presentation of biometric information such as a face image, a fingerprint image and vein image is requested again in the matching, the feature data of the presented biometric information is extracted, a similarity with the enrolled feature data is calculated, and it is determined whether the data is matched or not. Also, in a case of employing the matching apparatus according to the present invention, an authentication determination is carried out by calculating the similarity between the feature data enrolled and the feature data extracted from the biometric information presented in the matching and performing a matching determination, in the same manner. When the enrolled feature data and the query feature data in the matching are $z_{enroll}$ and $z_{query}$, respectively, the reconstructing section 101 reconstructs a two-dimensional pattern by inversely projecting the feature data $z_{enroll}$ and $z_{query}$ onto the two-dimensional pattern vector presentation space according to the following equations (4), respectively, and the two-dimensional patterns $u_{enroll}$ and $u_{query}$ in the vector form are calculated.

$$\vec{u}_{enroll} = W\vec{z}_{enroll}$$

$$\vec{u}_{query} = W\vec{z}_{query} \quad (4)$$

It should be noted that the enrolled feature data $z_{enroll}$ and the query feature data $z_{query}$ can be extracted by the above-mentioned manner on the basis of the inputted two-dimensional patterns f(s,t), respectively.

When arranged to a two-dimensional array in the reverse order of the raster scan in the same manner as that of the sampling of the vector x, the respective elements of the two-dimensional patterns $u_{enroll}$ and $u_{query}$ in the vector form produce two-dimensional patterns in the same space as that of the normalized face image. However, the pixel value itself is generally not the same as that of the inputted image. Presentations in the two-dimensional pattern of the vector presentations $u_{enroll}$ and $u_{query}$ are a reconstructed enrolled two-dimensional pattern $g_{enroll}(s,t)$ and a reconstructed query two-dimensional pattern $g_{query}(s,t)$, respectively.

By using the above-mentioned two-dimensional patterns $g_{enroll}(s,t)$ and $g_{query}(s,t)$ the similarity calculating section 103 calculates a similarity by using a pattern matching method such as the normalized correlation, the DP matching, and the active net.

For example, in the case of employing the normalized correlation, a value of a correlation coefficient R at a position (p,q) where the correlation coefficient R is maximized according to the following equation (5) is calculated as the similarity by moving a position of a pixel within a range of $\pm \alpha$ pixels (for example, $\alpha=3$) toward right, left, top, and bottom sides in consideration of a positional displacement of the image.

$$R(g_{enroll}(s,t), g_{query}(s,t); p, q) = \frac{\sum_{(s,t)} g_{enroll}(s,t) g_{query}(s-p, t-q)}{\sqrt{\sum_{(s,t)} g_{enroll}(s,t)^2} \sqrt{\sum_{(s,t)} g_{query}(s-p, t-q)^2}} \quad (5)$$

where $-\alpha \leq p \leq \alpha$ and $-\alpha \leq q \leq \alpha$. Accordingly, the matching that has corrected the positional displacement can be realized.

Also, in the case of employing the DP matching, the method described in the literature 15 can be used. In the method, the DP matching is performed independently to a horizontal direction and a vertical direction to the image. Thus, the flexible matching is carried out and the positional displacement and the distortion of the image can be eliminated. The similarity in the matching can be used as an evaluation measure in calculating the DP matching.

The DP matching method according to the literature 15 is a method of allowing a high-speed matching on an assumption that the distortion can be separated in the horizontal and vertical directions. In a case of the distortion that cannot be separated in the orthogonal directions, a method according to the active net described in the literature 16 may be used. The method basically requires a large amount of calculation and a long process time, but can carry out the matching even in the case of the distortion that cannot be separated in the orthogonal directions.

The determining section 104 determines whether the feature data is matched or not, by using the similarity between the feature data obtained by the above-mentioned similarity calculating section 103 and carrying out a threshold value determination on the basis of a predetermined threshold value.

1.2 Second Exemplary Embodiment

Next, a second exemplary embodiment where the present invention is applied to a fingerprint matching will be described. Unlike the case of a face, in the case of the fingerprint, the fingerprint is characterized by a periodical pattern and a repeated pattern. Thus, it has been known to use a frequency feature as described in the literatures 9 and literatures 10.

Figure 3:
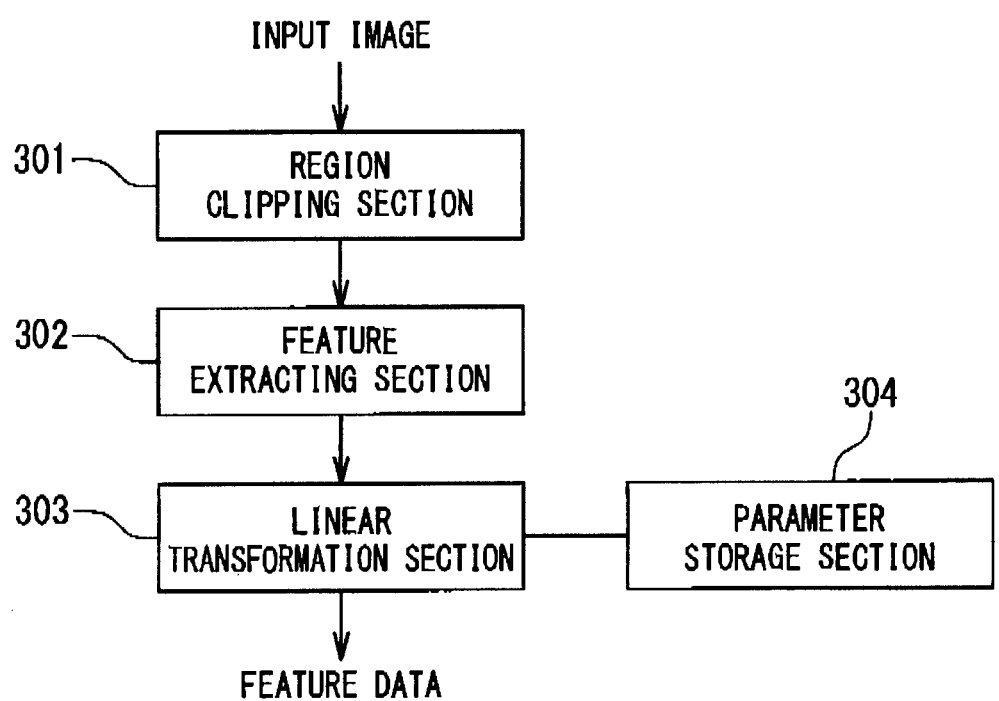
FIG. 3 is a block diagram showing a configuration of a feature extracting apparatus according to a second exemplary embodiment of the present invention.

FIG. 3 is a block diagram showing configuration of a feature extracting apparatus according to the second exemplary embodiment of the present invention. Referring to FIG. 3, the feature extracting apparatus according to the present exemplary embodiment includes a region clipping section 301 for clipping a fingerprint region from an inputted image, a feature extracting section 302 for extracting a frequency feature of the clipped region, a linear transformation section 303 for performing a linear transformation such as the principal component analysis and the discriminant analysis by using the obtained frequency feature, and a parameter storage section 304 for storing a parameter such as a basis matrix required to perform the linear transformation.

Figure 4:
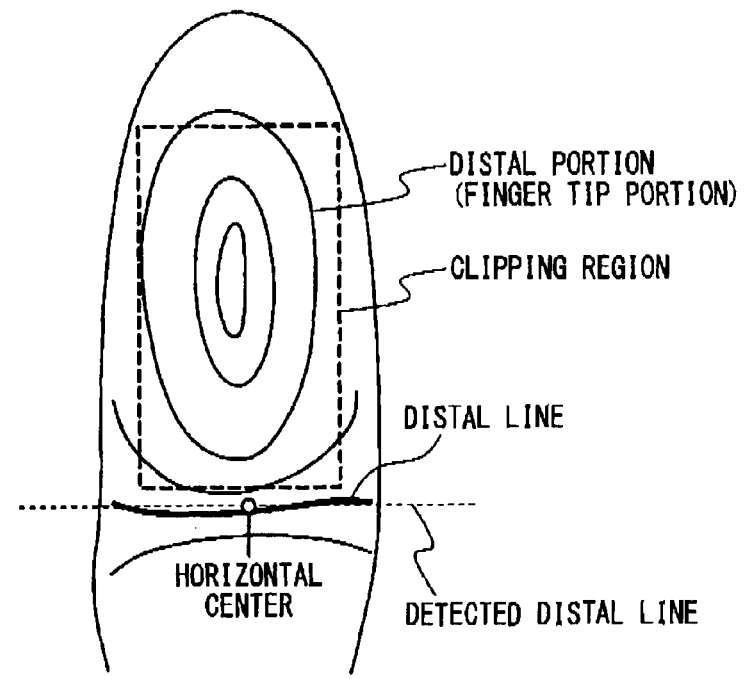
FIG. 4 is a diagram to explain a clipped region of a fingerprint pattern based on a distal line as a query.

The region clipping section 301 clips a predetermined region from the input fingerprint image. For example, the region of 128×256 pixels in a distal portion is clipped on the basis of a distal line of the finger as the image region f(s,t). In this case, a central position of the horizontal direction is determined based on the detected distal line and a central portion of a fingerprint region. In addition, a rectangular region in a direction of the distal portion from the central portion of the horizontal direction is a clipped region (refer to FIG. 4). It should be noted that the distal line of the finger can be detected by using the technique descried in the literature 6. Also, an inputted fingerprint image is desired to be imaged so that a tip of the finger is directed to an upper direction by a finger-putting guide.

The feature extracting section 302 performs the frequency analysis for each of the horizontal lines of the clipped fingerprint image region, and extracts frequency feature amounts such as a Fourier amplitude spectrum, an LPC spectrum, an LPC cepstrum, and GDS.

Figure 5:
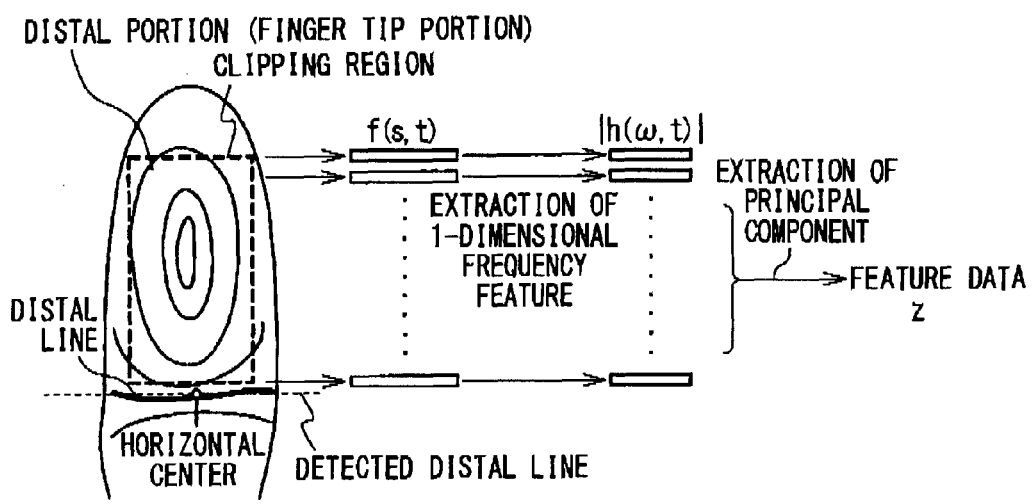
FIG. 5 is a diagram schematically showing an outline of a feature extraction process by the feature extracting apparatus according to the second exemplary embodiment of the present invention.

FIG. 5 is a diagram schematically showing an outline of a feature extracting process by the feature extracting apparatus according to the present exemplary embodiment. For example, an amplitude |h(ω,t)| of a Fourier spectrum h(ω,t) obtained by a discrete Fourier transformation only in the horizontal direction of the image f(s,t) (s=0 to S−1, t=0 to T−1; S=128 and T=256 in the case of a clip of 128×256 pixels) needs to be calculated (refer to the following equation (6)).

$$h(\omega, t) = \frac{1}{S}\sum_{s=0}^{S-1} f(s,t) e^{-2\pi i s \omega / S} \quad (6)$$

where ω=0, 1, . . . S−1. In this case, in consideration of a DC component that reflects total brightness of the pixel value and is not required for the discrimination; and symmetric property of the amplitude spectrum, the |h(ω,t)| (ω=1, 2, . . . , S/2−1) can be extracted as an amount of frequency feature without using a DC component |h(0,t)| and a symmetric component |h(ω,t)| (ω=S/2, S/2+1, . . . , S−1).

By using the transformed two-dimensional pattern obtained from the inputted two-dimensional pattern such as the above-mentioned |h(ω,t)| in place of the inputted two-dimensional pattern f(s,t) in the first exemplary embodiment, the matching can be realized in a space suitable for property of a query such as the frequency space.

In addition, in the case of extracting the LPC spectrum, the LPC cepstrum, and the GDS, the frequency feature is extracted by using the method described in the literature 9 and can be obtained by the following calculation, respectively.

The LPC spectrum is a spectrum obtained from a transfer function H(φ) of an all-pole filter estimated by a linear prediction method, and the transfer function H(φ) is given by a following equation (7), $$H(\phi) = \frac{1}{1 + \sum_{k=1}^{N_p} a_k \phi^{-k}} \quad (7)$$

where $a_k$ is a linear prediction coefficient, $N_p$ is a prediction order, φ is an operator in a Z transformation, and $\phi = e^{j\omega T}$ (T is a sampling interval).

In addition, the LPC cepstrum corresponds to coefficients obtained when the LPC spectrum is regarded as a waveform signal and shows a smooth envelope characteristic of the spectrum. The LPC cepstrum $C_n$ is obtained by the following equation (8), $$C_n = a_n - \sum_{m=1}^{n-1} \frac{m}{n} c_m a_{n-m} \quad (8)$$

where n=1, 2, . . . , $N_p$.

The linear transformation section 303 extracts the frequency feature obtained in this manner, for example, M principal components (M=300) of |h(ω,t)| by using the basis matrix $V_{PCA}$ stored in the parameter storage section 304. When a vector obtained by carrying out the raster scan to a two-dimensional array of the above-mentioned frequency feature |h(ω,t)| is a vector x, the principal components to be extracted (the feature data) can be calculated by the following equation (9).

$$\vec{z} = V_{PCA}^T \vec{x} \quad (9)$$

The basis matrix $V_{PCA}$ to extract the principal components in the above-mentioned equation obtains a frequency feature with respect to a fingerprint image for learning, obtains the principal components by previously carrying out the principal component analysis, and is stored in the parameter storage section 304.

In this manner, the feature data z can be calculated from the fingerprint image. In a case of carrying out the pattern matching to such feature data, the matching can be carried out by using the same matching apparatus as that of the first exemplary embodiment. Referring to FIG. 1, the operational different points will be mainly described below.

The reconstructing section 101 reconstructs a frequency feature v with respect to the obtained feature data z by using the same basis matrix $V_{PCA}$ as being used for obtaining the principal components.

$$\vec{v} = V_{PCA} \vec{z} \quad (10)$$

When the above-mentioned frequency feature v is rearranged to the two-dimensional array in the reverse order of the raster scan of the vector x, a two-dimensional array k(ω,t) in the same space as that of the frequency feature |h(ω,t)| can be obtained. It should be noted that the basis matrix $V_{PCA}$ has been stored in the parameter storage section 102.

By using the obtained two-dimensional array, the similarity calculating section 103 carries out the matching taking account of the positional displacement and distortion by using the normalized correlation, the DP matching, and the like. However, since the horizontal direction in the obtained two-dimensional array is a feature amount representing the frequency feature, the matching absorbing the positional displacement and distortion in only the vertical direction is carried out. When a two-dimensional array of enrolled data to be matched is expressed as $k_{enroll}(\omega,t)$ and a query two-dimensional array in the matching is expressed as $k_{query}(\omega,t)$, in the case of using the normalized correlation, a position of the image is displaced within a range of ±α pixels (for example, ten pixels) to a top and bottom sides in consideration of the positional displacement in at direction, and a value of the correlation coefficient R at a position q where the correlation coefficient R according to the following equation (11) is maximized is calculated as the similarity, $$R(k_{enroll}(\omega,t), k_{query}(\omega,t); q) = \frac{\sum_{(\omega,t)} k_{enroll}(\omega,t) k_{query}(\omega,t-q)}{\sqrt{\sum_{(\omega,t)} k_{enroll}(\omega,t)^2} \sqrt{\sum_{(\omega,t)} k_{query}(\omega,t-q)^2}} \quad (11)$$

where $-\alpha \leq q \leq \alpha$. Accordingly, the matching that has corrected the positional displacement in the t direction can be realized.

When the DP matching is employed instead of the above-mentioned normalized correlation, the matching robust to the distortion can be realized. In performing the DP matching between the reconstructed two-dimensional arrays $k_{enroll}(\omega,t)$ and $k_{query}(\omega,t)$, the DP matching can be performed by regarding as a time series signal changing in the t direction. An inter-signal distance $d_{DP}$ in application of the DP matching is calculated on the basis of a Euclidean distance and a city-block distance regarding elements in a ω direction as a vector. In this case, the distance $d_{DP}$ between a signal at point t1 of the $k_{enroll}(\omega,t)$ and a signal at point t2 of the $k_{query}(\omega,t)$ is represented by the following equation (12).

$$d_{DP} = \sum_{\omega=1}^{S/2-1} |k_{enroll}(\omega,t_1) - k_{query}(\omega,t_2)| \quad (12)$$

An inter-signal distance value when the DP matching is carried out so that the above-mentioned inter-signal distance can be minimized is outputted as the similarity. In this case, since the distance is in the DP matching, the evaluation value shows that as the value becomes smaller, the images are more similar.

In addition, the matching method employing the Hidden Markov Model (HMM) disclosed in the literature 10 also can be used. In this case, the array is dealt with under a condition that the array is considered as time series data of the frequency feature $k(\omega,t)$ in the t direction. Since a transition of the time-series data can be absorbed by a statistical probability model in the HMM, a robust matching can be realized by statistically comprehending a personal feature, the distortion, and the positional displacement.

The determining section 104 carries out the process in the same manner as that of the example of the first exemplary embodiment by using an obtained similarity. As described above, in the case of matching the periodical pattern such as the fingerprint pattern, a mismatch caused by a repeated pattern is avoided by using a one-dimensional frequency feature and the matching tough in the positional displacement and distortion can be realized.

1.3 Third Exemplary Embodiment

Figure 6:
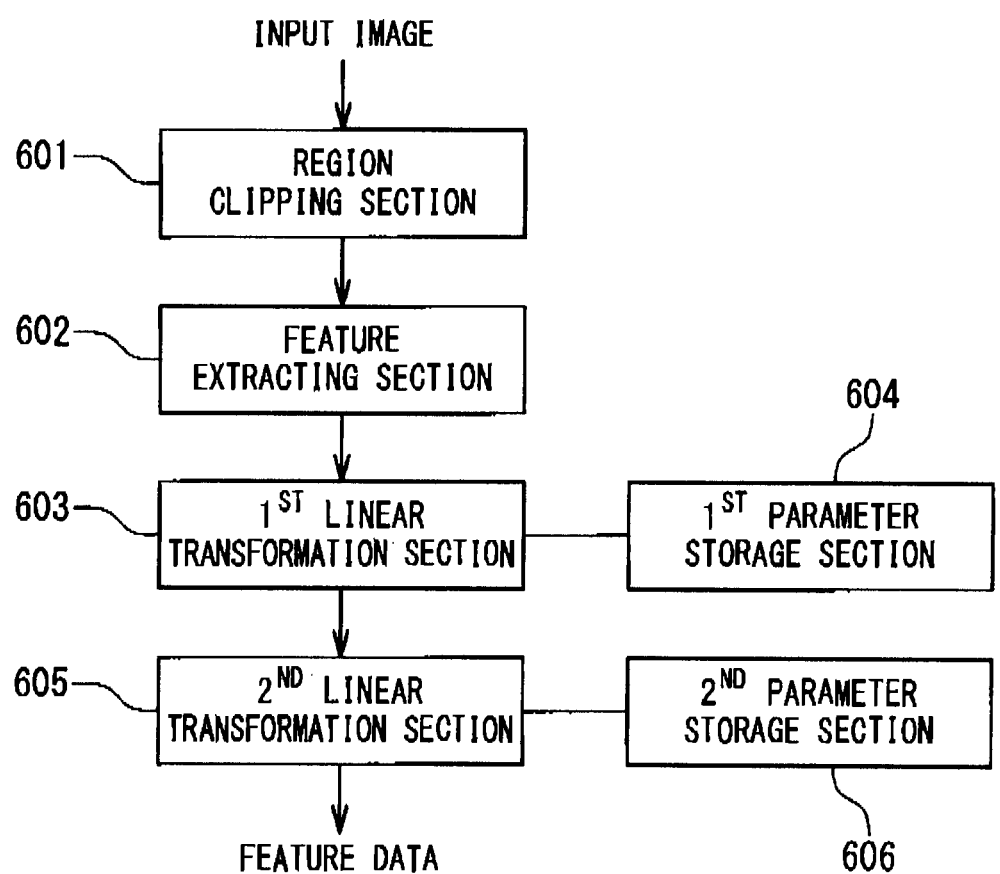
FIG. 6 is a block diagram showing a configuration of a feature extracting apparatus according to a third exemplary embodiment of the present invention.

Next, a third exemplary embodiment of the present invention configured by modifying the above-described second exemplary embodiment will be described. FIG. 6 is a block diagram showing a configuration of a feature extracting apparatus according to the third exemplary embodiment of the present invention. Referring to FIG. 6, the feature extracting apparatus according to the present exemplary embodiment includes a region clipping section 601, a feature extracting section 602 for extracting a frequency feature, a first linear transformation section 603 for obtaining principal components of the frequency feature, a first parameter storage section 604 for storing a first basis matrix for the first linear transformation section, a second linear transformation section 605 for obtaining principal components of a combination vector formed by combining principal components for the respective lines, and a second parameter storage section 606 for storing a second basis matrix for the second linear transformation section.

The feature extracting apparatus of FIG. 6 carries out a same operation as the feature extracting apparatus of the above-mentioned second exemplary embodiment till the extraction of the frequency feature. A feature of the feature extracting apparatus of the present exemplary embodiment is in that a linear transformation is carried out for each line in the extraction of the principal components from the extracted frequency feature and then the principal components are extracted again by using the principal components obtained for each line.

Figure 7:
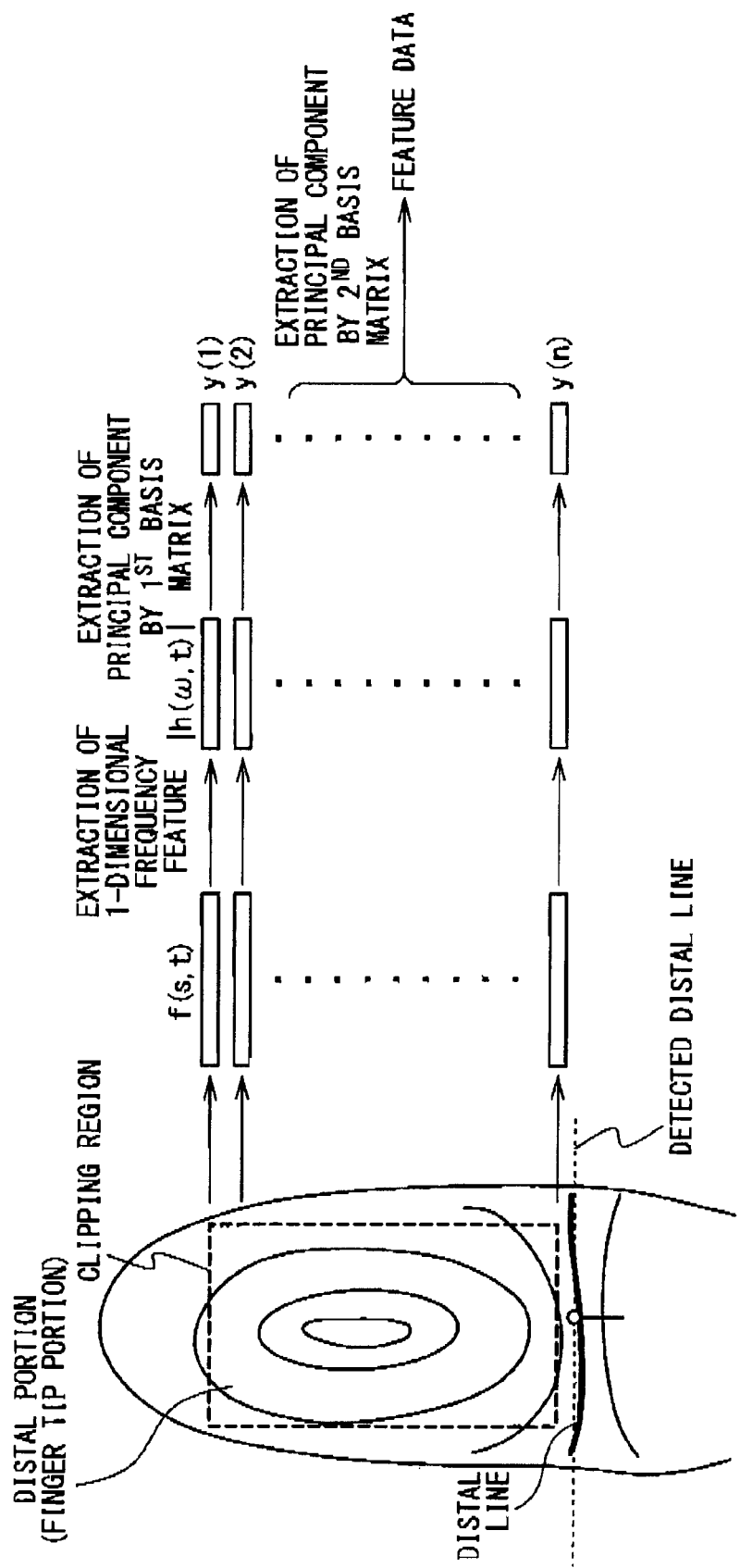
FIG. 7 is a diagram schematically showing an outline of a feature extraction process by the feature extracting apparatus according to the third exemplary embodiment of the present invention.

FIG. 7 is a diagram schematically showing an outline of a feature extraction process by the feature extracting apparatus according to the present exemplary embodiment. The feature extracting section 602 calculates a Fourier spectrum in accordance with the above-mentioned equation (6), and calculates a frequency feature $|h(\omega,t)|$ ($\omega=0$ to 63, $t=0$ to 255 in the case of 128×256 pixels) in consideration of a DC component and symmetric property of the amplitude spectrum.

The first linear transformation section 603 calculates $M_1$ (for example, $M_1=16$) principal components y(t) of the vector x(t) (refer to the following equation (13)) composed of the $S/2-1$ elements $|h(\omega,t)|$ as elements in each line by using the basis matrix $V_{PCA1}$ in the following equation (14).

$$\vec{x}(t) = \begin{pmatrix} |h(1,t)| \\ |h(2,t)| \\ \vdots \\ |h(S/2-1,t)| \end{pmatrix} \quad (13)$$

$$\vec{y}(t) = V_{PCA1}^T \vec{x}(t) \quad (14)$$

It should be noted that the vector y(t) is an $M_1$-dimensional vector. In addition, the first basis matrix $V_{PCA1}$ for obtaining the principal components is previously calculated by carrying out the principal component analysis using data for learning, and is stored in the first parameter storage section 604.

The second linear transformation section 605 combines the obtained T vectors y(t), and when the combination vector is a vector Y (refer to the following equation (15)), the second linear transformation section 605 calculates the $M_2$ ($M_2=300$) principal components z of the vector Y by using the basis matrix $V_{PCA2}$ by the following equation (16).

$$\vec{Y} = \begin{pmatrix} \vec{y}(0) \\ \vec{y}(1) \\ \vdots \\ \vec{y}(T-1) \end{pmatrix} \quad (15)$$

$$\vec{z} = V_{PCA2}^T \vec{Y} \quad (16)$$

The above-mentioned second basis matrix $V_{PCA2}$ also is previously calculated by carrying out the principal component analysis using data for learning, and is stored in the second parameter storage section 606.

In the matching, in the same manner as the second exemplary embodiment, U of the following equation (17) is calculated from feature data z by the reconstructing section 101 by using the second basis matrix $V_{PCA2}$ stored in the parameter storage section 102.

$$\vec{U} = V_{PCA2} \vec{z} \quad (17)$$

The respective elements of the vector U obtained in the above-mentioned equation are approximate representations of a vector sequence y(t) obtained by the feature extracting apparatus, and can be shown by the following equation (18) when each of the elements are shown by u(t).

$$\vec{U} = \begin{pmatrix} \vec{u}(0) \\ \vec{u}(1) \\ \vdots \\ \vec{u}(T-1) \end{pmatrix} \quad (18)$$

The similarity calculating section 103 carrying out the DP matching regarding the enrolled data $u_{enroll}(t)$ and the query data $u_{query}(t)$ as time series data, and calculates the similarity. As a distance in the DP matching, the Euclidean distance of the following equation (19) and the like is used instead of the above equation (12).

$$d_{DP} = |\vec{u}_{enroll}(t_1) - \vec{u}_{query}(t_2)| \quad (19)$$

For example, when an amount of three hundred-dimensional data has been extracted, the basis matrix $V_{PCA2}$ in the third exemplary embodiment includes 1,228,800 elements in a matrix of (16×256) rows and 300 columns. Since the number of elements was 4,838,400 in a matrix of (63×256) rows and 300 columns in the second exemplary embodiment, the matching apparatus in the third exemplary embodiment has a merit of using only a quarter portion of the memory region. In addition, since the data amount after the reconstruction is 63×256=16,128 dimensions in the second exemplary embodiment compared to the third exemplary embodiment of 16×256=4,096 dimensions, the data amount becomes approximately quarter, and accordingly the approximately four times faster matching can be realized.

1.4 Fourth Exemplary Embodiment

Figure 8:
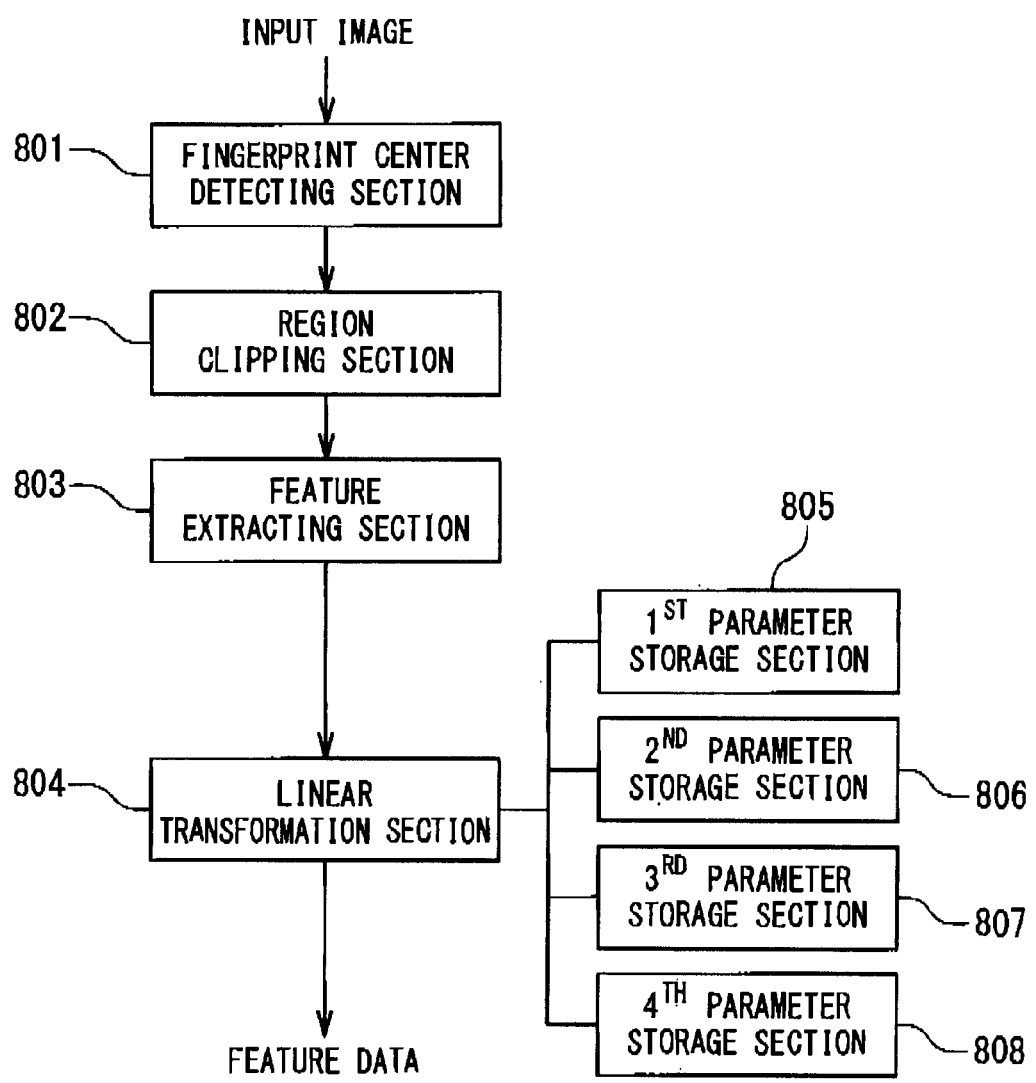
FIG. 8 is a block diagram showing a configuration of a feature extracting apparatus according to a fourth exemplary embodiment of the present invention.

Next, a fourth exemplary embodiment of the present invention configured by modifying the above-described second exemplary embodiment will be described. FIG. 8 is a block diagram showing a configuration of a feature extracting apparatus according to the fourth exemplary embodiment of the present invention. Referring to FIG. 8, the feature extracting apparatus according to the present exemplary embodiment includes a fingerprint center detecting section 801 for detecting a fingerprint center, a region clipping section 802 for clipping a central region of the fingerprint, a feature extracting section 803 for extracting a frequency feature of the clipped region, a linear transformation section 804 for projecting the frequency feature to a feature space by using a basis matrix, four parameter storage sections 805 to 808 for storing the basis matrixes used by the linear transformation section 804.

In the fingerprint pattern, a distribution of the pattern is different between an upper portion (a tip portion) of the fingerprint pattern and a lower portion (a distal line side). In the upper portion of the fingerprint pattern, a semi-circular pattern is generally, formed, but in the lower portion, a distinctive pattern as typified by a pattern such as a whorl and a loop is formed and there are many types of patterns. The feature extracting apparatus of the present exemplary embodiment realizes highly-accurate pattern identification by changing the basis matrix depending on a difference of such a local distribution of pattern.

Figure 9:
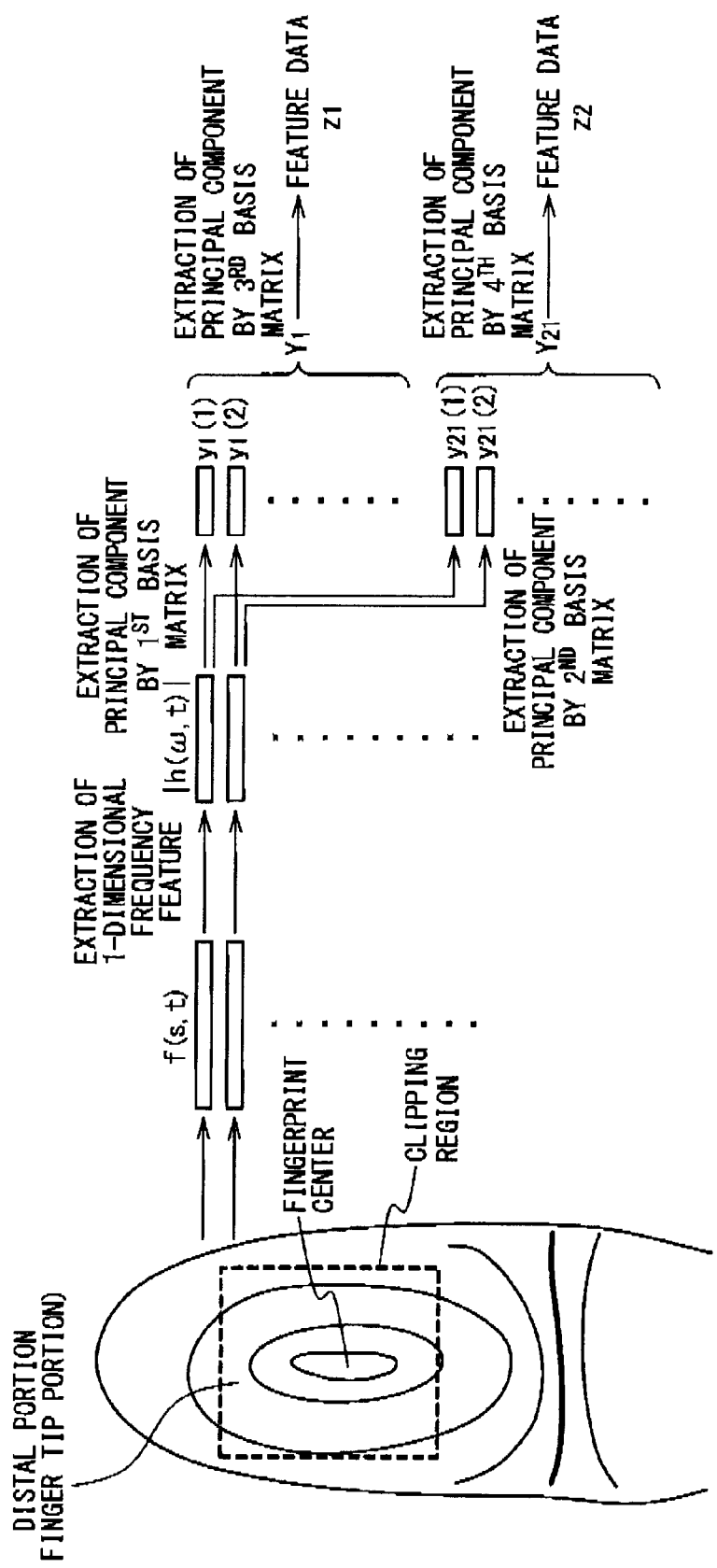
FIG. 9 is a diagram schematically showing an outline of a feature extraction process by the feature extracting apparatus according to the fourth exemplary embodiment of the present invention.

Referring to FIG. 9, an operation of the feature extracting apparatus according to the present exemplary embodiment will be described below.

The fingerprint center detecting section 801 detects a fingerprint center from the inputted fingerprint image. The technique described in the literature 7 can be used for the detection of the fingerprint center. The region clipping section 802 clips the central region of the fingerprint in a predetermined size (for example, 128×128 pixels in S=128 and T=128) based on the detected fingerprint center as a reference. Here, it is assumed that the clipped image of the central region is f(s,t).

The feature extracting section 803 carries out the Fourier transformation to the central region image f(s,t) in a horizontal direction in accordance with the above-mentioned equation (6), and calculates a Fourier amplitude spectrum $|h(\omega,t)|$. The linear transformation section 804 carries out linear transformations at two steps in two types, four times in total, by using the obtained Fourier amplitude spectrum $|h(\omega,t)|$ and the basis matrixes stored in the parameter storage section 805 to 808, changing the basis matrix, and calculates two types of feature data.

Firstly, in the linear transformation at the first step, the linear transformation to extract principal components of a frequency spectrum for each line is carried out. A spectrum for each line in which a DC element of the Fourier amplitude spectrum $|h(\omega,t)|$ and symmetric elements are removed is determined as a vector x(t) in accordance with the equation (13). The principal components are extracted in the following equations (20) by applying two types of basis matrixes $V_{PCA1}$ and $V_{PCA2}$ to the vector x(t).

$$\vec{y}_1(t) = V_{PCA1}^T \vec{x}(t)$$

$$\vec{y}_2(t) = V_{PCA2}^T \vec{x} \quad (20)$$

The basis matrixes $V_{PCA1}$ and $V_{PCA2}$ are basis matrixes of S/2−1 rows and $M_1$ columns previously obtained by the principal component analysis so as to extract the $M_1$ (for example, $M_1$=16) Fourier amplitude spectrums of each line, and are stored in the first and second parameter storage sections 805 and 806, respectively. The basis matrix $V_{PCA1}$ is different from the basis matrix $V_{PCA2}$ in a following point. The basis matrix $V_{PCA1}$ is previously obtained by carrying out the principal component analysis using the Fourier amplitude spectrums for each line obtained from the upper portion of the fingerprint as a set of learning data so as to express a portion of the upper portion of the fingerprint. Meanwhile, the basis matrix $V_{PCA2}$ is previously obtained by carrying out the principal component analysis using the Fourier amplitude spectrums in each line obtained from the lower portion of the fingerprint as a set of learning data.

Next, in the linear transformation at the second step, principal components $y_i(t)$ obtained in the transformation in the first stage are combined, the linear transformation using a discriminant matrix is carried out to the combination vector $Y_i$ (refer to the following equations (21)), the $M_2$ ($M_2$=300) discriminant elements $z_i$ are obtained in the following equations (22), and they are outputted as the feature data.

$$\vec{Y_1} = \begin{pmatrix} \vec{y_1}(0) \\ \vec{y_1}(1) \\ \vdots \\ \vec{y_1}(T-1) \end{pmatrix} \quad (21)$$

$$\vec{Y_2} = \begin{pmatrix} \vec{y_2}(0) \\ \vec{y_2}(1) \\ \vdots \\ \vec{y_2}(T-1) \end{pmatrix}$$

$$\vec{z_1} = V_{LDA1}^T \vec{Y_1} \quad (22)$$
$$\vec{z_2} = V_{LDA2}^T \vec{Y_2}$$

The discriminant matrixes $V_{LDA1}$ and $V_{LDA2}$ are previously calculated by a Linear Discriminant Analysis (LDA) using the learning data set of each of the fingerprint upper portion and the fingerprint lower portion, are stored in the third and fourth parameter storage sections 807 and 808. Meanwhile, a size of the discriminant matrix is 2048 (=16×128) rows and 300 columns in the case of $M_1$=16, T=128, and $M_2$=300. When the basis matrix and the discriminant matrix for the principal components are prepared separately for the fingerprint upper portion and the fingerprint lower portion, the feature data effective in the identification can be extracted more efficiently.

Figure 10:
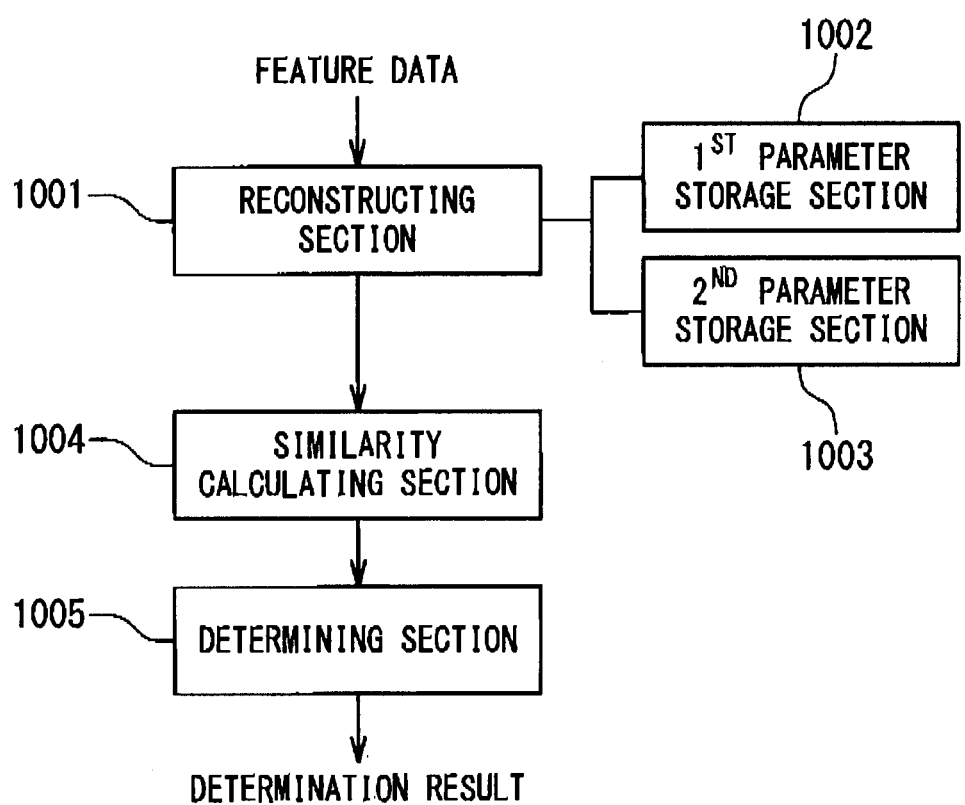
FIG. 10 is a block diagram showing a configuration of a matching apparatus according to the fourth exemplary embodiment of the present invention.

Next, a matching apparatus for carrying out the matching using the feature data extracted by the feature extracting apparatus in the fourth exemplary embodiment will be described. FIG. 10 is a block diagram showing a configuration of the matching apparatus according to the fourth exemplary embodiment of the present invention. Referring to FIG. 10, the matching apparatus according to the present exemplary embodiment includes a reconstructing section 1001 for carrying out the reconstruction from the feature data, two parameter storage sections 1002 and 1003 for storing the discriminant matrixes, a similarity calculating section 1004 for carrying out the matching by the DP matching regarding the reconstructed data as time-series data and for calculating a similarity, and a determining section 1005.

The reconstructing section 1001 of the matching apparatus according to the present exemplary embodiment calculates $U_2$ and $U_2$ in the following equations (23) from feature data $z_1$ and $Z_2$ by using the first and second discriminant matrixes $V_{LDA1}$ and $V_{LDA2}$ stored in the first and second parameter storage sections 1002 and 1003.

$$\vec{U_1} = V_{LDA1} \vec{z_1}$$

$$\vec{U_2} = V_{LDA2} \vec{z_2} \quad (23)$$

The vector $U_i$ in the above-mentioned equation is a vector obtained by reconstructing the feature data to a space of the vector $Y_i$. The respective elements of the vector $U_i$ correspond to a vector string $y_i(t)$ obtained by the feature extracting apparatus, and can be represented by the following equations (24) when the elements are shown by $u_i(t)$.

$$\vec{U_1} = \begin{pmatrix} \vec{u_1}(0) \\ \vec{u_1}(1) \\ \vdots \\ \vec{u_1}(T-1) \end{pmatrix} \quad (24)$$

$$\vec{U_2} = \begin{pmatrix} \vec{u_2}(0) \\ \vec{u_2}(1) \\ \vdots \\ \vec{u_2}(T-1) \end{pmatrix}$$

In this manner, the reconstructed data $u_1(t)$ and $u_2(t)$ are features reflecting the original Fourier amplitude spectrum $|h(\omega,t)|$, respectively, but are signals in which elements ineffective in the discrimination are removed by projection of the discriminant matrix. Based on differences of the respective discriminant matrixes, $u_1(t)$ shows a characteristic superior in the discrimination of the fingerprint upper portion, and $u_2(t)$ shows a characteristic superior in the discrimination of the fingerprint lower portion. Based on the characteristics, the weighting based on a position is carried out to two reconstruction data, and the data is reconstructed to be one data string by the following equation (25).

$$\vec{u}(t) = w(t)\vec{u}_1(t) + (1-w(t))\vec{u}_2(t) \quad (25)$$

Figure 11:
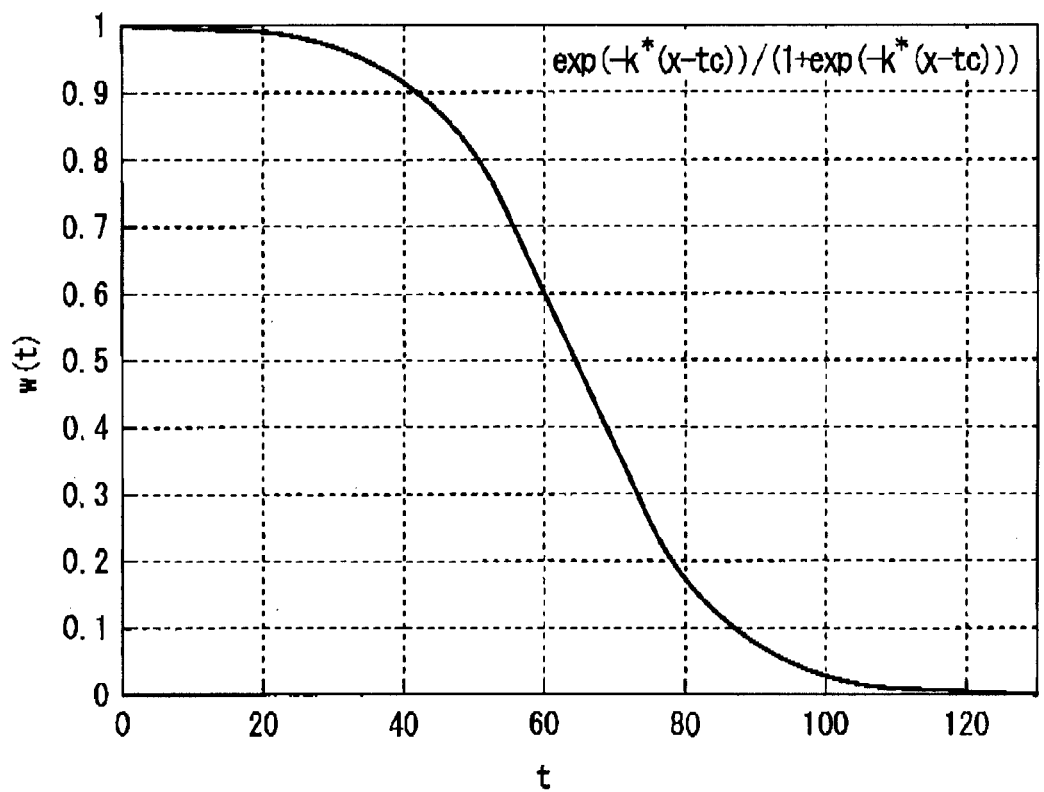
FIG. 11 is one example of a function used for the weighting of data obtained by two discriminant matrixes in the fourth exemplary embodiment of the present invention.

Here, w(t) is a function for the weighting depending on a position, and a function for weighting data to be close to w=1 in the fingerprint upper portion and to be w=0 in the fingerprint lower portion, for example, as shown in FIG. 11 and the following equation (26) is employed. Here, $t_c$ is a position of the fingerprint center and k is a weighting coefficient.

$$w(t) = \frac{e^{-k(t-t_c)}}{1 + e^{-k(t-t_c)}} \quad (26)$$

In the same manner as the third exemplary embodiment, the similarity calculating section 1004 and the determining section 1005 carries out the DP matching and the determining process by using the data string u(t) obtained as described above.

1.5 Fifth Exemplary Embodiment

Figure 12:
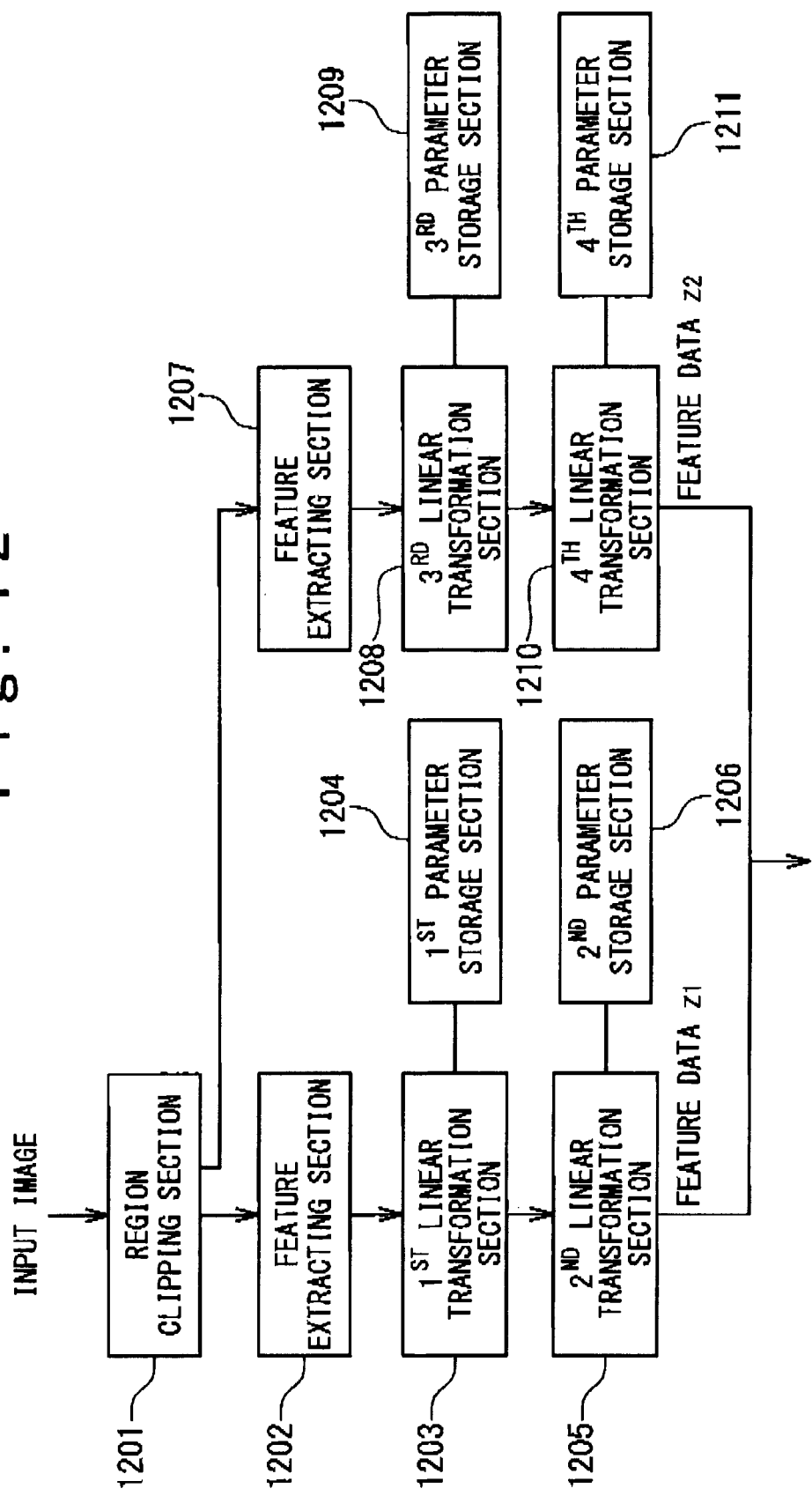
FIG. 12 is a block diagram showing a configuration of a feature extracting apparatus according to a fifth exemplary embodiment of the present invention.

Next, an example of a fifth exemplary embodiment of the present invention configured so as to obtain principal components in horizontal and vertical directions by modifying the above-mentioned third exemplary embodiment will be described. FIG. 12 is a block diagram showing a configuration of a feature extracting apparatus according to the fifth exemplary embodiment of the present invention. Referring to FIG. 12, the feature extracting apparatus according to the present exemplary embodiment includes a region clipping section 1201, a feature extracting section 1202 for extracting a frequency feature in the horizontal direction, a first linear transformation section 1203 for obtaining principal components of the frequency feature in the horizontal direction, a first parameter storage section 1204 for storing a first basis matrix for the first linear transformation section, a second linear transformation section 1205 for obtaining principal components of a combination vector formed by combining principal components for the respective horizontal lines, a second parameter storage section 1206 for storing a second basis matrix for the second linear transformation section, a feature extracting section 1207 for extracting the frequency feature in the vertical direction, a third linear transformation section 1208 for obtaining principal components of the frequency feature in the vertical direction, a third parameter storage section 1209 for storing a third basis matrix for the third linear transformation section, a fourth linear transformation section 1210 for obtaining principal components of the combination vector formed by combining principal components of the respective vertical lines, and a fourth parameter storage section 1211 for storing a fourth basis matrix for the fourth linear transformation section.

Figure 14:
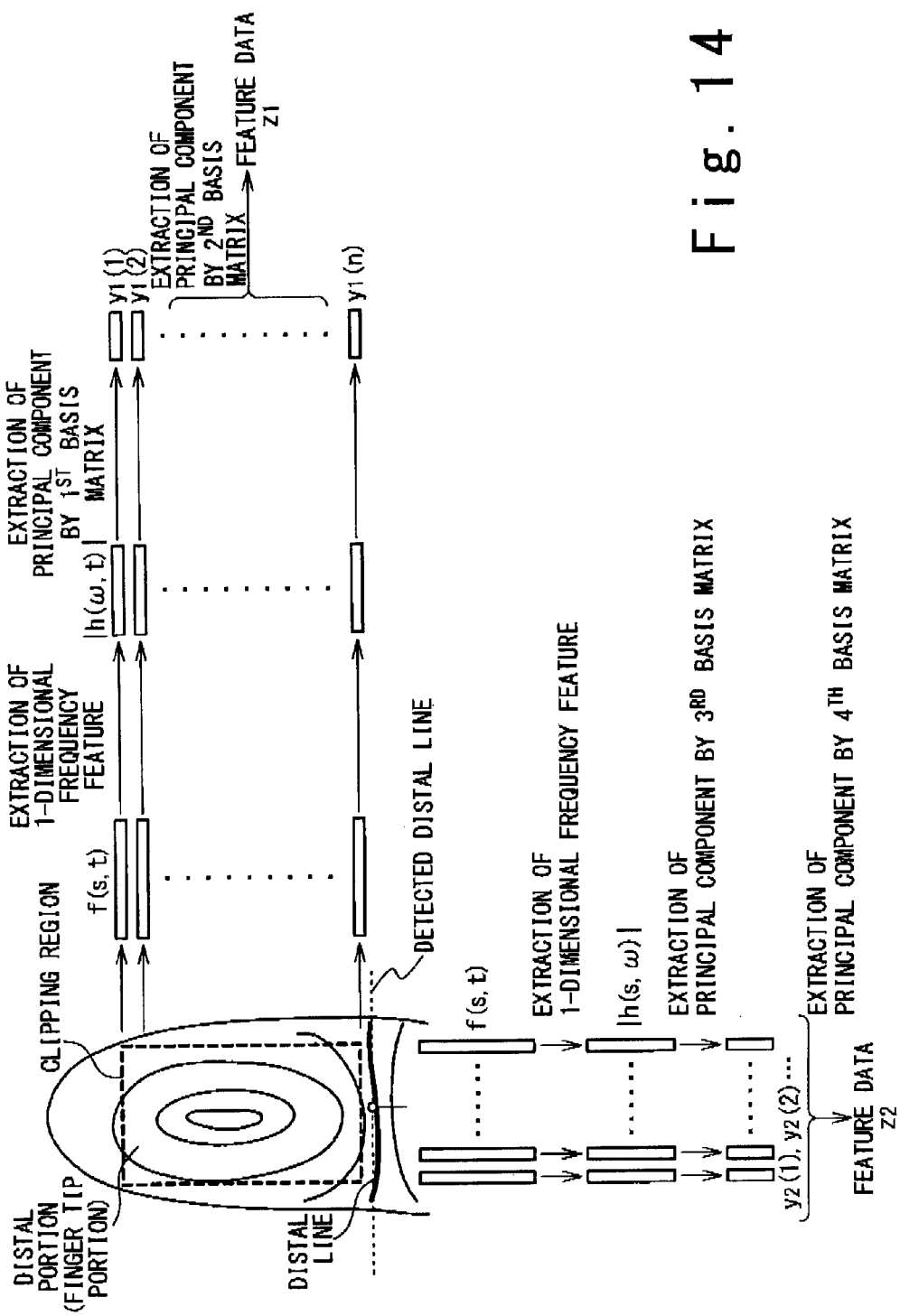
FIG. 14 is a diagram schematically showing an outline of a feature extraction process by the feature extracting apparatus according to the fifth exemplary embodiment of the present invention.

Referring to FIG. 14, an operation of the feature extracting apparatus according to the present exemplary embodiment will be described below.

The region clipping section 1201, the feature extracting section 1202, the first linear transformation section 1203, the first parameter storage section 1204, the second linear transformation section 1205 and the second parameter storage section 1206 are the same as those of the third exemplary embodiment, and extract the feature data $z_1$ by using the basis matrixes $V_{PCA1}$ and $V_{PCA2}$.

The feature extracting section 1207, the third linear transformation section 1208, the third parameter storage section 1209, the fourth linear transformation section 1210, and the fourth parameter storage section 1211 are different only in that the frequency feature is obtained through the frequency analysis in the vertical direction, but other operations are the same as those of the above-mentioned respective sections that handle the frequency feature in the horizontal direction.

The feature extracting section 1207 regarding the frequency feature in the vertical direction calculates a one-dimensional Fourier amplitude spectrum in the vertical direction with respect to the input image f(s,t) (S=128 and T=256 in a case o clipping a region in 128×256 pixels; s=0 to S−1 and t=0 to T−1) in each line by the following equation (27).

$$h(s, \omega) = \frac{1}{T}\sum_{t=0}^{T-1} f(s, t)e^{-2\pi i t \omega/T} \quad (27)$$

The third linear transformation section 1208 calculates $M_3$ (for example, $M_3$=16) principal components $y_2(s)$ of a vector $x_2(s)$ (refer to the following equation (28)) including T/2−1 elements |h(s,ω)| for each line by using the basis matrix $V_{PCA3}$ by the equation (29) in consideration of a DC component and symmetric property of the amplitude spectrum.

$$\vec{x_2}(s) = \begin{pmatrix} |h(s, 1)| \\ |h(s, 2)| \\ \vdots \\ |h(s, T/2-1)| \end{pmatrix} \quad (28)$$

$$\vec{y_2}(s) = V_{PCA3}^T \vec{x_2}(s) \quad (29)$$

It should be noted that a vector $y_2(s)$ is a $M_3$-dimensional vector. In addition, the third basis matrix $V_{PCA3}$ of T/2−1 rows and $M_3$ columns (for example, 127 rows and 16 columns) for obtaining the principal components is previously calculated by carrying out the principal component analysis to the $x_2(s)$ using data for learning, and is stored in the third parameter storage section 1209.

The fourth linear transformation section 1210 combines the obtained S vectors y(s), and the fourth linear transformation section 1210 calculates the principal components $z_2$ of the combination vector $Y_2$ (refer to the following equation (30)) by using the fourth basis matrix $V_{PCA4}$ in the following equation (31).

$$\vec{Y_2} = \begin{pmatrix} \vec{y_2}(0) \\ \vec{y_2}(1) \\ \vdots \\ \vec{y_2}(S-1) \end{pmatrix} \quad (30)$$

$$\vec{z_2} = V_{PCA4}^T \vec{Y_2} \quad (31)$$

The above-mentioned fourth basis matrix $V_{PCA4}$ also is previously calculated by carrying out, the principal component analysis using data for learning, and is stored in the fourth parameter storage section 1211. Both of the feature vector $z_2$ obtained in this manner and the feature vector $z_1$ obtained by the second linear transformation section 1205 are outputted as the feature data.

Figure 13:
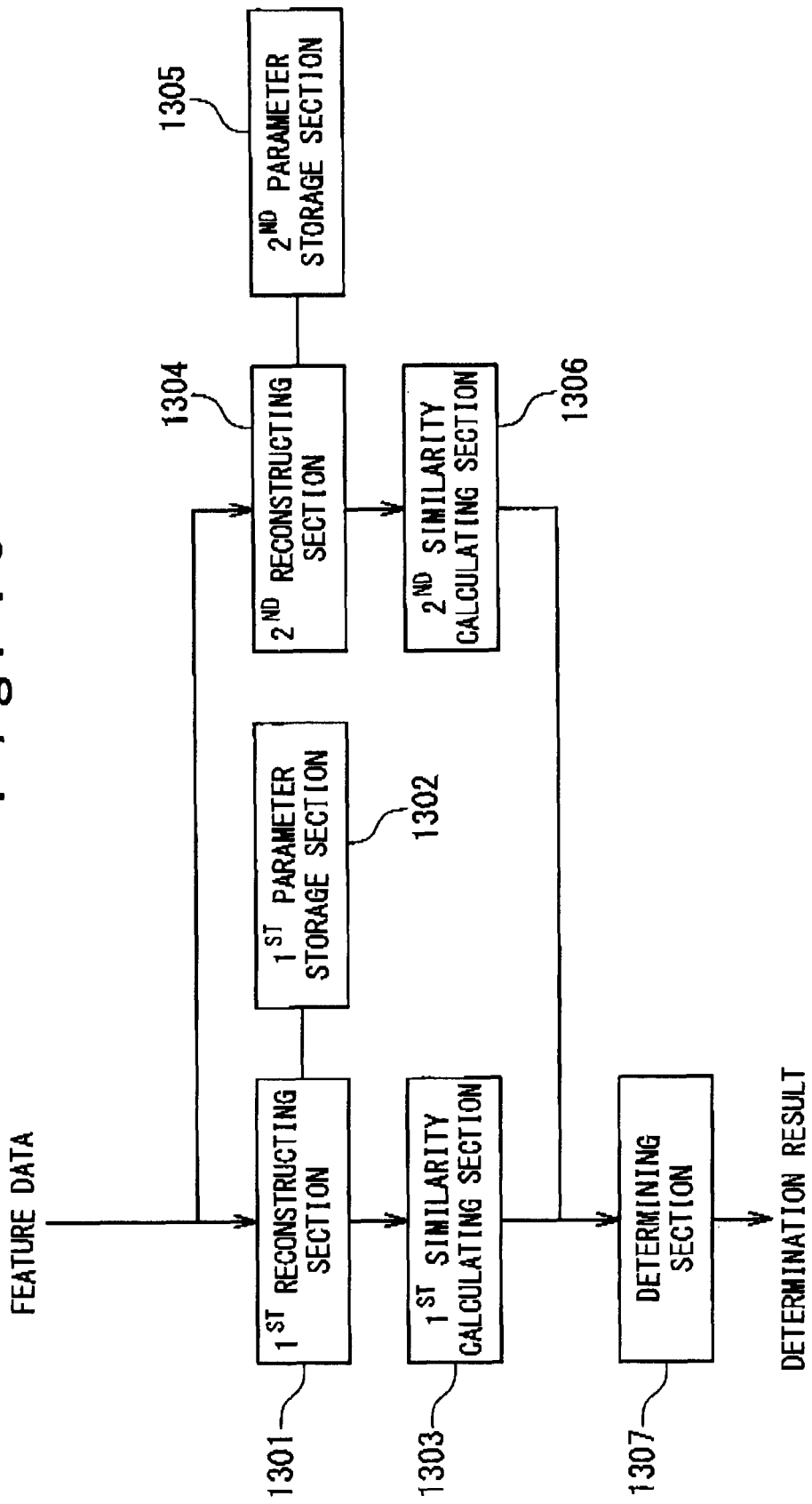
FIG. 13 is a block diagram showing a configuration of a matching apparatus according to the fifth exemplary embodiment of the present invention.

Next, the matching apparatus for carrying out the matching based on the feature data extracted by the feature extracting apparatus in the fifth exemplary embodiment will be described. FIG. 13 is a block diagram showing a configuration of the matching apparatus according to the fifth exemplary embodiment of the present invention, Referring to FIG. 13, the matching apparatus according to the present exemplary embodiment includes a first reconstructing section 1301 for carrying out the reconstruction from the feature data in the horizontal direction, a first parameter storage section 1302 for storing a basis matrix for the reconstruction in the horizontal direction, a first similarity calculating section 1303 for carrying out the matching by the DP matching regarding the reconstructed data as time series data and for calculating a similarity, a second reconstructing section 1304 for carrying out the reconstruction from the feature data in the vertical direction, a second parameter storage section 1305 for storing a fourth basis matrix for the reconstruction in the vertical direction, a second similarity calculating section 1306 for carrying out the matching by the DP matching regarding the reconstructed data as time series data and for calculating a similarity, and a determining section 1307 for carrying out determination based on the similarity calculated by the similarity calculating sections 1303 and 1306.

The reconstructing sections 1301 and 1304 of the matching apparatus according to the present exemplary embodiment calculates $U_1$ and $U_2$ reconstructed from the feature data $z_2$ and $z_2$ to a space of the vectors $Y_1$ and $Y_2$ by using the second and fourth basis matrixes $V_{PCA2}$ and $V_{PCA4}$ stored in the first and second parameter storage sections 1302 and 1305, respectively.

When the vector strings obtained by the above-mentioned reconstruction are $u_1(t)$ and $u_2(s)$, respectively, and the matrixes are shown by a following equations (32).

$$\begin{pmatrix} \vec{u_1}(0) \\ \vec{u_1}(1) \\ \vdots \\ \vec{u_1}(T-1) \end{pmatrix} = V_{PCA2}\vec{z_1} \qquad (32)$$

$$\begin{pmatrix} \vec{u_2}(0) \\ \vec{u_2}(1) \\ \vdots \\ \vec{u_2}(S-1) \end{pmatrix} = V_{PCA4}\vec{z_2}$$

The first similarity calculating section 1303 and the second similarity calculating section 1306 calculate similarities $d_1$ and $d_2$ by carrying out the DP matching in the same manner as that of the third exemplary embodiment, regarding the data strings $u_1(t)$ and $u_2(s)$ obtained as described above as time series data respectively in a t direction and a s direction. It should be noted that the normalized correlation and the similarity calculation based on the HMM may be carried out.

The determining section 1307 weights the above-mentioned similarities $d_1$ and $d_2$ by using the following equation (33), calculates a linear summation d, and carries out the determining process by comparing the summation to a predetermined threshold value.

$$d = d_1 \cos\theta + d_2 \sin\theta \qquad (33)$$

where $\theta$ is a parameter for determining the weighting of the two similarities within a range of $0 \leq \theta \leq \pi/2$.

As described above, in the present exemplary embodiment, the matching robust to the deformation and the positional displacement of a fingerprint toward a right, left, top, and bottom sides and a highly-accurate identification can be realized by carrying out the frequency analysis and the DP matching not only to one direction but also to both of two-dimensional directions in the horizontal and vertical directions.

1.6 Sixth Exemplary Embodiment

Figure 15:
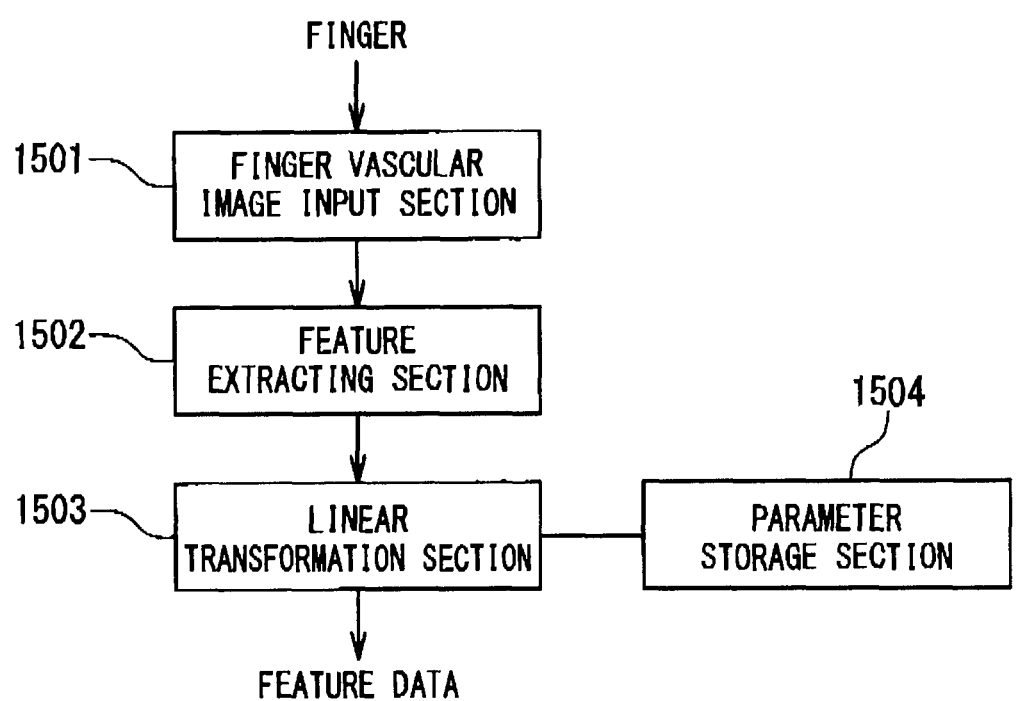
FIG. 15 is a block diagram showing a configuration of a feature extracting apparatus according to a sixth exemplary embodiment of the present invention.

Next, a sixth exemplary embodiment of the present invention where the present invention is applied to the matching of a vein image (vascular pattern) of a finger will be described. FIG. 15 is a block diagram showing a configuration of the feature extracting apparatus according to the sixth exemplary embodiment of the present invention. Referring to FIG. 15, the feature extracting apparatus according to the present exemplary embodiment includes a finger vascular image input section 1501, a feature extracting section 1502 for extracting a frequency feature from the vascular image, a linear transformation section 1503 for extracting principal components of the frequency feature, and a parameter storage section 1504 for storing a basis matrix to extract the principal component.

Figure 16A:
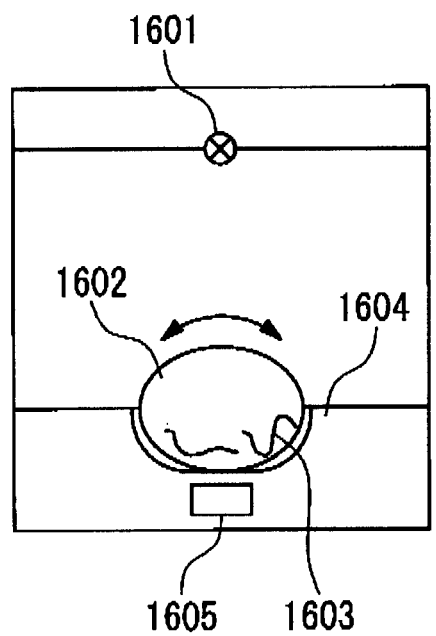
FIG. 16A is an appearance diagram of a device for imaging a vascular pattern, the device corresponding to a finger vascular image input part of FIG. 15.
Figure 16B:
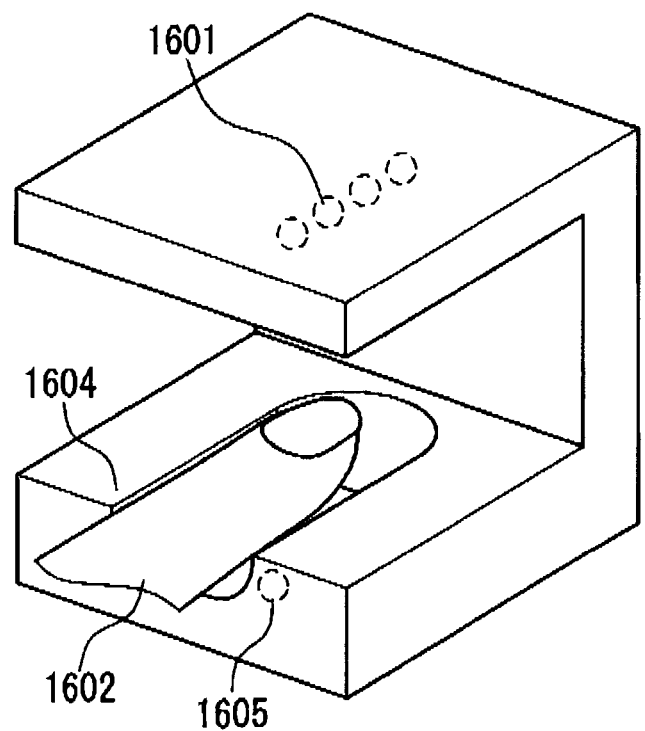
FIG. 16B is an appearance diagram of the device for imaging the vascular pattern, the device corresponding to the finger vascular image input part of FIG. 15.

FIGS. 16A and 16B are appearance diagrams of a device for imaging a vascular pattern usable as the finger vascular image input section 1501. FIG. 16A is a cross-section view in which an extension direction of a finger is a normal line. FIG. 16B is a perspective view. This type of an imaging device for a vascular pattern is described, for example, in the literature 8. Referring to FIGS. 16A and 16B, the imaging device for the vascular pattern mainly includes a near-infrared LED light source 1601 for irradiating a transmission light of a predetermined wavelength (for example, 850 nm) to a finger, a guide 1604 for placing a finger 1602 in a stable state, and a camera 1605 for imaging a vascular (pattern) 1603. The guide 1604 has a shape that suppresses rotation in a direction perpendicular to a longitudinal direction of the finger.

Figure 17:
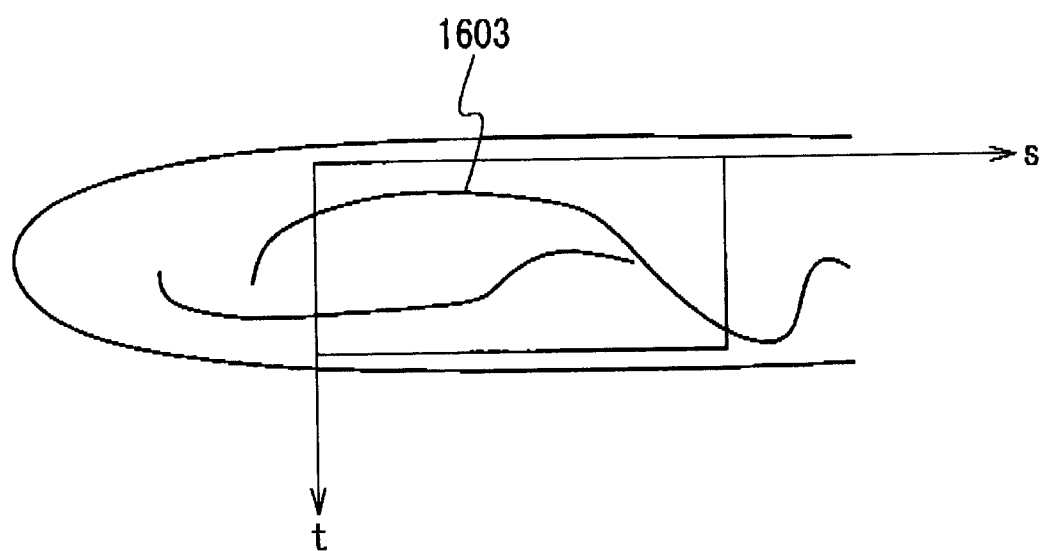
FIG. 17 is a diagram to explain a clipped region of a finger vascular image.

Here, as shown in FIG. 17, a longitudinal direction of the finger is an s-axis and a direction perpendicular to the longitudinal direction of the finger is a t-axis, and an image portion clipped from a picked-up image in the size of 128 pixels×64 pixels is an image f(s,t) (s=0 to 127 and t=0 to 63).

The following process is the same as that of the second exemplary embodiment, the feature extracting section 1502 calculates the frequency feature $|h(\omega,t)|$ in the horizontal direction (the s direction), and the linear transformation section 1503 extracts principal components by using the basis matrix $V_{PCA}$ stored in the parameter storage section 1504 and extracts feature data z.

The above-mentioned matching of the obtained feature data z also can be performed by using the DP matching in the same manner as that of the second exemplary embodiment.

In this case, the DP matching is carried out in the vertical direction (the t direction); this is because a variation in the t direction becomes relatively large in the case of the vascular image of the finger. This is dependent on the following reasons. A picked-up vascular image is a projection image of blood vessels (mainly veins) existing slightly inside the finger. The variation in the t direction perpendicular to the longitudinal direction s of the finger is suppressed by the guide 1604; however rotation around the s axis of the finger is suppressed by the installation of the guide to some extent but still easily varies. The distortion of the image due to the rotation of the finger is enlarged near a periphery of the finger, and appears as stretch and shrinkage in the t axis direction. When an influence of the stretch and shrinkage of this image is effectively matched by the DP matching, the highly-accurate matching can be realized.

Meanwhile, also to the matching of the vascular image, a feature extracting method and a matching method can be applied which are described in the third exemplary embodiment that combines the principal components after extracting the principal components of the frequency feature for each line and that extracts the principal components again and matches the elements; the fourth exemplary embodiment that changes the basis matrix for each portion; and the fifth exemplary embodiment that extracts the elements in the horizontal direction and in the vertical direction respectively and matches the elements.

As described above, the preferred exemplary embodiments of the present invention have been described, but various modifications can be carried out within a scope of the present invention that extracts the feature data by carrying out the dimensional compression to the two-dimensional pattern or the feature amount obtained from the two-dimensional pattern by using the projection, inversely projecting the feature data to reconstruct the feature representation in an original space, and carrying out the matching. For example, in the above-mentioned exemplary embodiments, an application of the biometric identification such as the face identification, the fingerprint identification, and the vein identification has been described as an example; however the present invention can be applied to not only a biological body but also a matching of a general object.

The invention claimed is:

1. A 2-dimensional pattern matching method comprising:
previously enrolling an enrollment feature data which is a vector data in a feature space;
inputting a query 2-dimensional pattern;
extracting a query feature data by projecting a vector representation of either of said query 2-dimensional pattern and a transformed query 2-dimensional pattern which is generated by transforming said query 2-dimensional pattern into the feature space;

generating an enrollment 2-dimensional pattern and a reconstructed query 2-dimensional pattern by inversely projecting said enrollment feature data and said query feature data into a 2-dimensional pattern representation space which has dimensions of the vector representation; and calculating a similarity between said enrollment 2-dimensional pattern and said reconstructed query 2-dimensional pattern.

2. The 2-dimensional pattern matching method according to claim 1, wherein said generating comprises:

generating said reconstructed query 2-dimensional pattern by inversely projecting said query feature data by using a linear transformation which is defined by a basis matrix.

3. The 2-dimensional pattern matching method according to claim 1, wherein said extracting comprises:

generating said transformed query 2-dimensional pattern by extracting a 1-dimension frequency feature every horizontal line or vertical line of said query 2-dimensional pattern, and generating a vector representation of said transformed query 2-dimensional pattern; and extracting said query feature data by compressing the vector representation in dimension by a first linear transformation which is defined by a basis matrix, and wherein said generating comprises: generating said reconstructed query 2-dimensional pattern by inversely projecting said query feature data by using said basis matrix which defines said first linear transformation.

4. The 2-dimensional pattern matching method according to claim 1, wherein said extracting comprises:

generating said transformed query 2-dimensional pattern by extracting a 1-dimension frequency feature every horizontal line or vertical line of said query 2-dimensional pattern;

generating the vector representation by combining 1-dimensional frequency features extracted for every line by a first linear transformation which is defined by a first basis matrix; and extracting said query feature data by compressing the vector representation in dimension by a second linear transformation which is defined by a second basis matrix, and wherein said generating comprises:

generating said reconstructed query 2-dimensional pattern by inversely projecting said query feature data onto said 2-dimensional pattern representation space by using the basis matrix used for said second linear transformation.

5. The 2-dimensional pattern matching method according to claim 4, wherein said enrolling comprises:

enrolling a horizontal direction enrollment feature data and 'a vertical direction enrollment feature data as said enrollment feature data, wherein said extracting comprises:

generating said transformed query 2-dimensional pattern by extracting a 1-dimensional frequency feature as a horizontal direction frequency feature for every horizontal line of said query 2-dimensional pattern;

generating a horizontal direction representation of the vector representation by combining said horizontal direction frequency features extracted for every horizontal line by said first linear transformation which is defined by the first basis matrix;

extracting a horizontal direction representation of said query feature data by compressing said horizontal direction representation in dimension by said second linear transformation which is defined by the second basis matrix;

extracting a 1-dimensional frequency feature as a vertical direction frequency feature every vertical line of said query 2-dimensional pattern;

generating a vertical direction representation of the vector representation by combining said vertical direction frequency features extracted for every said vertical line by a third linear transformation which is defined by a third basis matrix; and extracting the vertical direction representation of said query feature data by compressing the vertical direction representation in dimension by a fourth linear transformation which is defined by a fourth basis matrix, wherein said enrollment 2-dimensional pattern comprises a horizontal direction enrollment 2-dimensional pattern and a vertical direction enrollment 2-dimensional pattern, wherein said reconstructed query 2-dimensional pattern comprises a horizontal direction reconstructed query 2-dimensional pattern and a vertical direction reconstructed query 2-dimensional pattern, wherein said generating comprises:

generating said horizontal direction enrollment 2-dimensional pattern and said horizontal direction reconstructed query 2-dimensional pattern by inversely projecting said horizontal direction enrollment feature data and the horizontal direction representation of said query feature data by using the basis matrix which is used for said second linear transformation; and generating said vertical direction enrollment 2-dimensional pattern and a vertical direction reconstructed query 2-dimensional pattern by inversely projecting said vertical direction enrollment feature data and the vertical direction representation of said query feature data by using the basis matrix which used for said fourth linear transformation, and wherein said calculating comprises:

calculating the similarity between said horizontal direction enrollment 2-dimensional pattern and said horizontal direction reconstructed query 2-dimensional pattern; and calculating the similarity between said vertical direction enrollment 2-dimensional pattern and said vertical direction reconstructed query 2-dimensional pattern.

6. The 2-dimensional pattern matching method according to claim 1, wherein said enrolling comprises:

enrolling a first region enrollment feature data and a second region enrollment feature data as said enrollment feature data, wherein said extracting comprises:

extracting a first region query feature data by transforming a vector representation of a first region of said query 2-dimensional pattern by a first region basis matrix; and extracting a second region query feature data by transforming a vector representation of a second region of said query 2-dimensional pattern by a second region basis matrix, wherein said reconstructed query 2-dimensional pattern comprises a first region reconstructed query 2-dimensional pattern and a second region reconstructed query 2-dimensional pattern, and wherein said generating comprises:

generating said first region reconstructed query 2-dimensional pattern by inversely projecting said first region query vector by using the first region basis matrix;

generating said second region reconstructed query 2-dimensional pattern by inversely projecting said second region query vector by using the second region basis matrix; and generating said reconstructed query 2-dimensional pattern by performing a predetermined weighting to each of said first region reconstructed query 2-dimensional pattern of and said second region reconstructed query 2-dimensional pattern.

7. The 2-dimensional pattern matching method according to claim 1, wherein said calculating comprises:

calculating the similarity by using a DP matching.

8. A 2-dimensional pattern feature extracting method which extracts a feature data of a 2-dimensional pattern and which is used for the 2-dimensional pattern matching method according to claim 1, wherein said extracting comprises:

generating said transformed query 2-dimensional pattern by extracting a 1-dimensional frequency feature every horizontal line or vertical line of said query 2-dimensional pattern and generating the vector representation of said transformed query 2-dimensional pattern; and extracting said query feature data as the feature data of said query 2-dimensional pattern by compressing the vector representation in dimension by a first linear transformation which is defined by a basis matrix.

9. A 2-dimensional pattern feature extracting method used for the 2-dimensional pattern matching method according to claim 1, wherein said extracting comprises:

generating said transformed query 2-dimensional pattern by extracting the 1-dimensional frequency feature every horizontal line or vertical line of said query 2-dimensional pattern;

generating the vector representation by combining 1-dimensional frequency features extracted for every line by a first linear transformation which is defined by a first basis matrix; and extracting said query feature data as said 2-dimensional pattern feature data by compressing the vector representation in dimension by a second linear transformation which is defined by a second basis matrix.

10. The 2-dimensional pattern feature extracting method according to claim 9, wherein said extracting comprises:

generating said transformed query 2-dimensional pattern by extracting a 1-dimensional frequency feature as the horizontal direction frequency feature for every horizontal line of said query 2-dimensional pattern;

generating a horizontal direction representation of the vector representation by combining said horizontal direction frequency features extracted for every said horizontal line by said first linear transformation which is defined by the first basis matrix;

extracting a horizontal direction representation of said query feature data by compressing said horizontal direction representation in dimension by said second linear transformation which is defined by the second basis matrix;

extracting a 1-dimensional frequency feature as the vertical direction frequency feature every vertical line of said query 2-dimensional pattern;

generating a vertical direction representation of the vector representation by combining said vertical direction frequency features extracted for every said vertical line by a third linear transformation which is defined by a third basis matrix; and extracting the vertical direction representation of said query feature data by compressing the vertical direction representation in dimension by a fourth linear transformation which is defined by a fourth basis matrix, wherein said reconstructed query 2-dimensional pattern comprises a horizontal direction reconstructed query 2-dimensional pattern and a vertical direction reconstructed query 2-dimensional pattern, and wherein said generating comprises:

generating said horizontal direction reconstructed query 2-dimensional pattern by inversely projecting the horizontal direction representation of said query feature data by using the basis matrix which is used for said second linear transformation; and generating said vertical direction reconstructed query 2-dimensional pattern by inversely projecting the vertical direction representation of said query feature data by using the basis matrix which used for said fourth linear transformation.

11. The 2-dimensional pattern feature extracting method according to claim 9, wherein said extracting comprises:

extracting a first region query feature data by transforming a vector representation of a first region of said query 2-dimensional pattern by a first region basis matrix; and extracting a second region query feature data by transforming a vector representation of a second region of said query 2-dimensional pattern by a second region basis matrix, wherein said reconstructed query 2-dimensional pattern comprises a first region reconstructed query 2-dimensional pattern and a second region reconstructed query 2-dimensional pattern, and wherein said generating comprises:

generating said first region reconstructed query 2-dimensional pattern by inversely projecting said first region query vector by using said first region basis matrix;

generating said second region reconstructed query 2-dimensional pattern by inversely projecting said second region query vector by using said second region basis matrix; and generating said reconstructed query 2-dimensional pattern by performing a predetermined weighting to each of said first region reconstructed query 2-dimensional pattern of and said second region reconstructed query 2-dimensional pattern.

12. A 2-dimensional pattern matching apparatus which performs a matching of a query 2-dimensional pattern by using an enrollment feature data which is a vector data in a feature space and is enrolled in advance, said 2-dimensional pattern matching apparatus comprising:

a linear transformation section configured to extract a query feature data by projecting a vector representation of either of said query 2-dimensional pattern and a transformed query 2-dimensional pattern which is generated by transforming said query 2-dimensional pattern, to said feature space;

a reconstructing section configured to generate an enrollment 2-dimensional pattern and a reconstructed query 2-dimensional pattern by inversely projecting said enrollment feature data and said query feature data to a 2-dimensional pattern representation space which has dimensions of the vector representation; and a determining section configured to calculate a similarity between said enrollment 2-dimensional pattern and said reconstructed query 2-dimensional pattern.

13. The 2-dimensional pattern matching apparatus according to claim 12, wherein said reconstructing section generates said reconstructed query 2-dimensional pattern by inversely projecting said query feature data by using a linear transformation which is defined by the basis matrix.

14. The 2-dimensional pattern matching apparatus according to claim 12, wherein said linear transformation section:
generates said transformed query 2-dimensional pattern by extracting a 1-dimension frequency feature every horizontal line or vertical line of said query 2-dimensional pattern, and generates the vector representation of said transformed query 2-dimensional pattern; and
extracts said query feature data by compressing the vector representation in dimension by a first linear transformation which is defined by a basis matrix, and
wherein said reconstructing section generates said reconstructed query 2-dimensional pattern by inversely projecting said query feature data by using the basis matrix which defines said first linear transformation.

15. The 2-dimensional pattern matching apparatus according to claim 12, wherein said linear transformation section:
extracts a 1-dimension frequency feature every horizontal line or vertical line of said query 2-dimensional pattern;
generates said transformed query 2-dimensional pattern by combining said 1-dimensional frequency features extracted for every line by a first linear transformation which is defined by a first basis matrix and generates the vector representation of said transformed query 2-dimensional pattern; and
extracts said query feature data by compressing the vector representation in dimension by a second linear transformation which is defined by a second basis matrix, and
wherein said reconstructing section generates said reconstructed query 2-dimensional pattern by inversely projecting said query feature data to said 2-dimensional pattern representation space by using the basis matrix used for said second linear transformation.

16. The 2-dimensional pattern matching apparatus according to claim 15, wherein said feature data comprises a horizontal direction enrollment feature data and a vertical direction enrollment feature data as said enrollment feature data,
wherein said linear transformation section:
extracts a 1-dimensional frequency feature as a horizontal direction frequency feature for every horizontal line of said query 2-dimensional pattern;
generates a horizontal direction representation of the vector representation by combining said horizontal direction frequency features extracted for every horizontal line by said first linear transformation which is defined by the first basis matrix;
extracts a horizontal direction representation of said query feature data by compressing said horizontal direction representation in dimension by said second linear transformation which is defined by the second basis matrix;
extracts a 1-dimensional frequency feature as a vertical direction frequency feature every vertical line of said query 2-dimensional pattern;
generates a vertical direction representation of the vector representation by combining said vertical direction frequency features extracted for every said vertical line by a third linear transformation which is defined by a third basis matrix; and
extracts the vertical direction representation of said query feature data by compressing the vertical direction representation in dimension by a fourth linear transformation which is defined by a fourth basis matrix,
wherein said enrollment 2-dimensional pattern comprises a horizontal direction enrollment 2-dimensional pattern and a vertical direction enrollment 2-dimensional pattern, wherein said reconstructed query 2-dimensional pattern comprises a horizontal direction reconstructed query 2-dimensional pattern and a vertical direction reconstructed query 2-dimensional pattern,
wherein said reconstructing section:
generates said horizontal direction enrollment 2-dimensional pattern and said horizontal direction reconstructed query 2-dimensional pattern by inversely projecting said horizontal direction enrollment feature data and the horizontal direction representation of said query feature data by using the basis matrix which is used for said second linear transformation; and
generates said vertical direction enrollment 2-dimensional pattern and said vertical direction reconstructed query 2-dimensional pattern by inversely projecting said vertical direction enrollment feature data and the vertical direction representation of said query feature data by using the basis matrix which used for said fourth linear transformation, and
wherein said determining section:
calculates the similarity between said horizontal direction enrollment 2-dimensional pattern and said horizontal direction reconstructed query 2-dimensional pattern; and calculates the similarity between said vertical direction enrollment 2-dimensional pattern and said vertical direction reconstructed query 2-dimensional pattern.

17. The 2-dimensional pattern matching apparatus according to claim 12, wherein said enrollment feature data comprises a first region enrollment feature data and a second region enrollment feature data,
wherein said linear transformation section:
extracts a first region query feature data by transforming a vector representation of a first region of said query 2-dimensional pattern by a first region basis matrix; and
extracts a second region query feature data by transforming a vector representation of a second region of said query 2-dimensional pattern by a second region basis matrix,
wherein said reconstructed query 2-dimensional pattern comprises a first region reconstructed query 2-dimensional pattern and a second region reconstructed query 2-dimensional pattern, and
wherein said reconstructing section:
generates said first region reconstructed query 2-dimensional pattern by inversely projecting said first region query vector by using the first region basis matrix;
generates said second region reconstructed query 2-dimensional pattern by inversely projecting said second region query vector by using the second region basis matrix; and
generates said reconstructed query 2-dimensional pattern by performing a predetermined weighting to each of said first region reconstructed query 2-dimensional pattern and said second region reconstructed query 2-dimensional pattern.

18. The 2-dimensional pattern matching apparatus according to claim 12, wherein said determining section calculates said similarity by using a DP matching.

19. A 2-dimensional pattern feature extracting apparatus which extracts the feature data of the 2-dimensional pattern and which is used for the 2-dimensional pattern matching apparatus according to claim 12, wherein said linear transformation section:
generates said transformed query 2-dimensional pattern by extracting a 1-dimensional frequency feature every horizontal line or vertical line of said query 2-dimensional pattern;
generates the vector representation of said transformed query 2-dimensional pattern; and extracts said query feature data as the feature data of said 2-dimensional pattern by compressing the vector representation in dimension by a first linear transformation which is defined by a basis matrix.

20. The 2-dimensional pattern feature extracting apparatus according to claim 19, wherein said linear transformation section:
   extracts a first region query feature data by transforming a vector representation of a first region of said query 2-dimensional pattern by a first region basis matrix; and
   extracts a second region query feature data by transforming a vector representation of a second region of said query 2-dimensional pattern by a second region basis matrix,
   wherein said reconstructed query 2-dimensional pattern comprises a first region reconstructed query 2-dimensional pattern and a second region reconstructed query 2-dimensional pattern, and wherein said reconstructing section:
   generates said first region reconstructed query 2-dimensional pattern by inversely projecting said first region query vector by using the first region basis matrix;
   generates said second region reconstructed query 2-dimensional pattern by inversely projecting said second region query vector by using the second region basis matrix; and generates said reconstructed query 2-dimensional pattern by performing a predetermined weighting to said first region reconstructed query 2-dimensional pattern and said second region reconstructed query 2-dimensional pattern.

21. A 2-dimensional pattern feature extracting apparatus which extracts a feature data of a 2-dimensional pattern and which is used in the 2-dimensional pattern matching apparatus according to claim 12, wherein said linear transformation section:
   extracts the 1-dimensional frequency feature every horizontal line or vertical line of said query 2-dimensional pattern;
   generates said transformed query 2-dimensional pattern by combining 1-dimensional frequency features extracted for every line by a first linear transformation which is defined by a first basis matrix to generate the vector representation of said transformed query 2-dimensional patter; and
   extracts said query feature data as said 2-dimensional pattern feature data by compressing the vector representation in dimension by a second linear transformation which is defined by a second basis matrix.

22. The 2-dimensional pattern feature extracting apparatus according to claim 21, wherein said linear transformation section:
   extracts a 1-dimensional frequency feature as the horizontal direction frequency feature every horizontal line of said query 2-dimensional pattern;
   generates a horizontal direction representation of the vector representation by combining said horizontal direction frequency features extracted for every said horizontal line by a first linear transformation which is defined by the first basis matrix;
   extracts a horizontal direction representation of said query feature data by compressing said horizontal direction representation in dimension by a second linear transformation which is defined by the second basis matrix;
   extracts a 1-dimensional frequency feature as the vertical direction frequency feature for every vertical line of said query 2-dimensional pattern;
   generates a vertical direction representation of the vector representation by combining said vertical direction frequency features extracted for every vertical line by a third linear transformation which is defined by a third basis matrix, and extracts a vertical direction representation of said query feature data by compressing said vertical direction representation in dimension by a fourth linear transformation which is defined by the fourth basis matrix,
   wherein said reconstructed query 2-dimensional pattern comprises a horizontal direction reconstructed query 2-dimensional pattern and a vertical direction reconstructed query 2-dimensional pattern, and
   said reconstructing section:
   generates said horizontal direction reconstructed query 2-dimensional pattern by inversely projecting the horizontal direction representation of said query feature data by using the basis matrix used for said second linear transformation; and
   generates said vertical direction reconstructed query 2-dimensional pattern by inversely projecting the vertical direction representation of said query feature data by using the basis matrix used for said fourth linear transformation.

23. A non-transitory computer-readable medium having machine instructions stored therein, the instructions being executable by a computer to cause the computer to execute a matching process program for a 2-dimensional pattern matching method in which a matching of a query 2-dimensional pattern is performed by using an enrollment feature data which is a vector data in a feature space and is enrolled in advance, said method comprising:
   inputting said query 2-dimensional pattern;
   extracting a query feature data by projecting a vector representation of either of said query 2-dimensional pattern and a transformed query 2-dimensional pattern which is generated by transforming said query 2-dimensional pattern, into a feature space;
   generating an enrollment 2-dimensional pattern and a reconstructed query 2-dimensional pattern by inversely projecting said enrollment feature data and said query feature data into a 2-dimensional pattern representation space which has dimensions of the vector representation; and
   calculating a similarity between said enrollment 2-dimensional pattern and said reconstructed query 2-dimensional pattern.

24. A non-transitory computer-readable medium having machine instructions stored therein, the instructions being executable by a computer to cause the computer to execute a feature extracting program for a feature extracting method which extracts a feature data of a 2-dimensional pattern and is used for a 2-dimensional matching method, said method comprising:
   generating said transformed query 2-dimensional pattern by extracting a 1-dimensional frequency feature for every horizontal line or vertical line of said query 2-dimensional pattern and generating the vector representation of said transformed query 2-dimensional pattern; and
   extracting said query feature data as said 2-dimensional pattern feature data by compressing the vector representation in dimension by a first linear transformation which is defined by a basis matrix.

25. A non-transitory computer-readable medium having machine instructions stored therein, the instructions being executable by a computer to cause the computer to execute a feature extracting program for a feature extracting method which extracts a feature data of a 2-dimensional pattern and is used for a 2-dimensional matching method, comprising:

extracting a 1-dimensional frequency feature every horizontal line or vertical line of said query 2-dimensional pattern;

generating said transformed query 2-dimensional pattern by combining said 1-dimensional frequency features extracted for every line by a first linear transformation which is defined by a first basis matrix, and generating the vector representation of said transformed query 2-dimensional pattern; and extracting said query feature data as said 2-dimensional pattern feature data by compressing the vector representation in dimension by a second linear transformation which is defined by a second basis matrix.

* * * * *

UNITED STATES PATENT AND TRADEMARK OFFICE
CERTIFICATE OF CORRECTION

PATENT NO. : 8,606,019 B2  
APPLICATION NO. : 12/597119  
DATED : December 10, 2013  
INVENTOR(S) : Toshio Kamei Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1084 days.

Signed and Sealed this
Twenty-second Day of September, 2015

Michelle K. Lee
*Director of the United States Patent and Trademark Office*